United States Patent [19]

Russ et al.

[11] Patent Number: 5,760,193
[45] Date of Patent: Jun. 2, 1998

[54] TRIAZINYL-SUBSTITUTED FIBER-REACTIVE AZO DYES WHEREIN THE TRIAZINYL GROUPS BEAR AN N-CONTAINING SUBSTITUENT, AND METHODS OF USING SAME

[75] Inventors: Werner Hubert Russ, Flörsheim; Christian Schumacher, Kelkheim; Wolfram Reddig, Leverkusen, all of Germany

[73] Assignee: DyStar Textilfarben GmbH & Co. Deutschland KG, Germany

[21] Appl. No.: 749,842

[22] Filed: Nov. 15, 1996

[30] Foreign Application Priority Data

Nov. 15, 1995 [DE] Germany ............... 195 42 547.2

[51] Int. Cl.⁶ ............... C09B 62/507; C09B 62/08; D06P 1/38
[52] U.S. Cl. ............... 534/605; 534/612; 534/633; 534/634; 8/549; 8/547
[58] Field of Search ............... 534/605, 612, 534/633, 634

[56] References Cited

U.S. PATENT DOCUMENTS

| | | | |
|---|---|---|---|
| 3,718,641 | 2/1973 | Muller et al. | 534/641 |
| 4,515,598 | 5/1985 | Meininger et al. | 8/549 |
| 4,649,193 | 3/1987 | Meininger et al. | 534/622 |
| 4,746,732 | 5/1988 | Tzikas | 534/637 |
| 4,935,501 | 6/1990 | Tzikas | 534/634 |
| 4,996,304 | 2/1991 | Tzikas | 534/637 |
| 5,270,454 | 12/1993 | Hoppe et al. | 534/634 |
| 5,342,927 | 8/1994 | Reddig et al. | 534/634 X |
| 5,420,256 | 5/1995 | Eizenhofer et al. | 534/634 X |
| 5,459,244 | 10/1995 | Kunde | 534/634 |
| 5,463,031 | 10/1995 | Jager et al. | 534/618 |
| 5,486,600 | 1/1996 | Deitz et al. | 534/634 |
| 5,541,300 | 7/1996 | Bootz et al. | 534/605 |

FOREIGN PATENT DOCUMENTS

| | | |
|---|---|---|
| 0 167 490 | 1/1986 | European Pat. Off. |
| 0 581 733 | 2/1994 | European Pat. Off. |
| 0 652 262 | 5/1995 | European Pat. Off. |
| 43 18 620 | 12/1994 | Germany |
| 43 33 777 | 4/1995 | Germany |

*Primary Examiner*—Fiona T. Powers
*Attorney, Agent, or Firm*—Connolly & Hutz

[57] ABSTRACT

Fiber-reactive azo dyes, processes for their preparation and their use

Azo dyes of the formula (1) given and defined below are described, which dyes contain fiber-reactive groups and dye hydroxy- and/or carboxamido-containing materials, in particular fiber materials, such as cotton, wool and synthetic polyamide fibers, in shades of high color strength and good fastness properties.

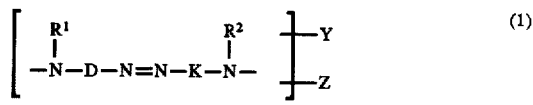

in which D is the radical of a diazo component from the benzene or naphthalene series, K is the radical of a coupling component of the formula (2)

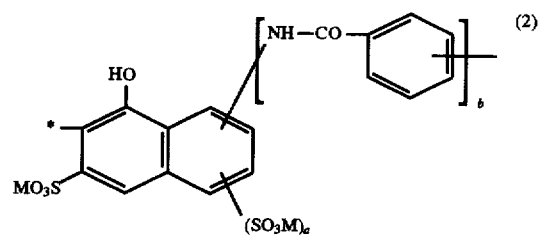

in which M is hydrogen or an alkali metal, a and b are each zero or 1, $R^1$ and $R^2$ are each hydrogen or substituted or unsubstituted alkyl, Y is attached to $-NR^1-$ or $-NR^2-$ and is a radical of the formula (3)

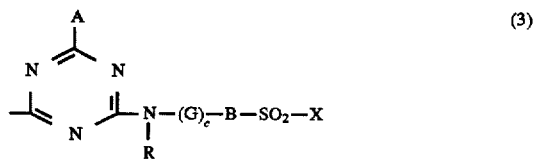

in which R is hydrogen, substituted or unsubstituted alkyl or substituted or unsubstituted phenyl, A is the radical of an amine or of an N-containing heterocycle, lower alkoxy or phenoxy, c is zero or 1, G is substituted or unsubstituted phenylene, B is lower alkylene or ethyleneoxyethylene and the group $-SO_2-X$ is β-hydroxyethylsulfonyl or a fiber-reactive group from the vinylsulfone series and Z is a heterocyclic fiber-reactive radical which is attached to $-NR^1-$ or $-NR^2-$ and is different from Y.

14 Claims, No Drawings

TRIAZINYL-SUBSTITUTED FIBER-REACTIVE AZO DYES WHEREIN THE TRIAZINYL GROUPS BEAR AN N-CONTAINING SUBSTITUENT, AND METHODS OF USING SAME

The invention is in the technical field of fiber-reactive dyes.

Fiber-reactive dyes have already been disclosed in a large number of publications, such as, for example, in U.S. Pat. Nos. 3,718,641, 4,515,598, 4,649,193, 4,746,732, 4,935,501 and 4,996,304, European Patent Application Publications Nos. 0,040,806 and 0,167,490, and furthermore in DE-A-4, 318,620 and 4,333,777 or in their respective U.S. Pat. Nos. 5,541,300 and 5,459,244.

The object of the present invention was to provide improved fiber-reactive dyes. Thus, the present invention provides new fiber-reactive dyes having the formula (1)

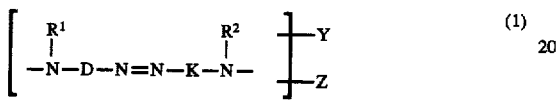

in which

D is the radical of a diazo component from the benzene or naphthalene series,

K is the radical of a coupling component of the formula (2)

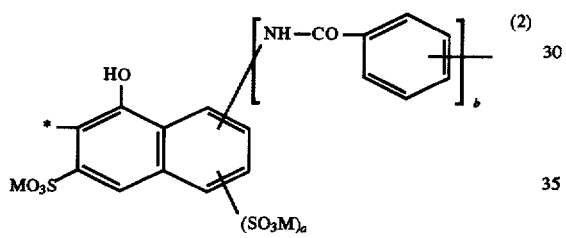

in which

M is hydrogen or an alkali metal, such as sodium, potassium or lithium, a is zero or 1 (where, if a is zero, this grouping is hydrogen), b is zero or 1, and the bond marked with * is attached to the azo group, R¹ is hydrogen or alkyl having 1 to 6 carbon atoms, preferably having 1 to 4 carbon atoms, such as methyl and ethyl, which may be substituted, such as, for example, by halogen, such as chlorine or bromine, hydroxy, carboxy, sulfo or sulfato, preferably hydrogen, R² is hydrogen or alkyl having 1 to 6 carbon atoms, preferably having 1 to 4 carbon atoms, such as methyl and ethyl, which may be substituted, such as, for example, by halogen, such as chlorine or bromine, hydroxy, carboxy, sulfo or sulfato, preferably hydrogen, Y is attached to the amino radical —NR¹— or —NR²— and is a radical of the formula (3)

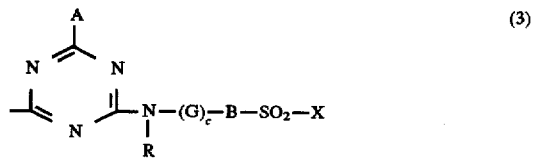

in which

R is hydrogen, alkyl of 1 to 4 carbon atoms, such as methyl or ethyl, which may be substituted, such as, for example, by substituents, preferably 1 or 2 substituents, selected from the group consisting of alkyl having 1 to 4 carbon atoms, such as methyl or ethyl, alkoxy having 1 to 4 carbon atoms, such as methoxy or ethoxy, sulfo, carboxy, chlorine and bromine, or is phenyl, which may be substituted, such as, for example, by substituents, preferably 1 or 2 substituents, selected from the group consisting of alkyl having 1 to 4 carbon atoms, such as methyl or ethyl, alkoxy having from 1 to 4 carbon atoms, such as methoxy or ethoxy, a group —SO₂—X having the meaning given below, sulfo, carboxy, chlorine and bromine, preferably hydrogen, methyl, phenyl or phenyl which is substituted by sulfo, carboxy, —SO₂—X, methyl and/or methoxy, A is amino, cyanoamino, alkoxy having from 1 to 4 carbon atoms, such as methoxy and ethoxy, phenoxy, the radical of an N-containing heterocycle which may contain a further hetero atom, such as N and O, such as pyridinyl or pyridinyl which is substituted by carboxy or aminocarbonyl, or is the radical of an N-containing saturated heterocycle which may contain a further hetero group or hetero atom, such as N, O and NH, such as morpholino, piperidino, pyrrolidino and piperazino, or is alkylamino or dialkylamino containing alkyl radicals of 1 to 4 carbon atoms, such as methyl and ethyl, which may be substituted by substituents selected from the group consisting of sulfo, carboxy, methyl, ethyl, methoxy and ethoxy, such as (β-sulfoethyl)amino and N-methyl-N-(β-sulfoethyl)amino, or phenylamino which is unsubstituted or substituted in the phenyl radical, the preferred substituents being 1 or 2 substituents selected from the group consisting of sulfo, carboxy, methyl, ethyl, methoxy and ethoxy, and preferably amino, sulfophenylamino, morpholino, N-methyl-(β-sulfoethyl)amino, (β-sulfoethyl)amino or cyanoamino, c is zero or 1, G is phenylene which may be substituted, such as, for example, by substituents, preferably 1 or 2 substituents, selected from the group consisting of chlorine, bromine, sulfo, carboxy, alkyl having 1 to 4 carbon atoms, such as ethyl and methyl, and alkoxy having 1 to 4 carbon atoms, such as methoxy and ethoxy, B is alkylene having 1 to 6 carbon atoms, preferably having 1 to 4 carbon atoms, or is ethyleneoxyethylene, and X is β-hydroxyethyl, vinyl, or is ethyl which is substituted in the β-position by a substituent which can be eliminated by alkali, Z is attached to the amino radical —NR¹— or —NR²— and is a heterocyclic fiber-reactive radical which is different from Y.

In the abovementioned formulae and in the formulae below, the individual formula members, not only those having different but also those having identical names within a formula, can have meanings which, within the scope of their meaning, are identical to or different from one another.

Examples of substituents in the β position relative to the ethyl group as formula radical X which can be eliminated by alkali are sulfato, thiosulfato, alkanoyloxy having 2 to 5 carbon atoms, such as propionyloxy and acetyloxy, phosphato, methylsulfonyloxy, thiocyanato, methylsulfonylamino, chlorine, bromine, fluorine, benzoyloxy, phenylsulfonyloxy, toluenesulfonyloxy, trimethylammonium containing a colorless anion, such as, for example, a chloride anion, a hydrogen sulfate anion or a hydrogen carbonate anion, or a pyridinium radical which is unsubstituted or substituted, such as, for example, a pyridinium radical which is substituted by substituted or unsubstituted alkyl having 1 to 4 carbon atoms, carboxy, sulfo, cyano or carbamoyl.

The groups "sulfo", "carboxy", "phosphato", "thiosulfato" and "sulfato" not only include their acid form but also their salt form. Accordingly, sulfo groups are groups of the formula —$SO_3M$, carboxy groups are groups of the formula —COOM, phosphato groups are groups of the formula —$OPO_3M_2$, thiosulfato groups are groups of the formula —S—$SO_3M$ and sulfato groups are groups of the formula —$OSO_3M$ where M has the abovementioned meaning.

Preferred substituents in the β position are chlorine, acetyloxy and, in particular, thiosulfato and, particularly preferably, sulfato.

Fiber-reactive radicals are groups which react with the hydroxy or amino groups of a fiber under dyeing conditions to give covalent bonds. Examples of fiber-reactive radicals Z are those containing at least one reactive substituent attached to a 5- or 6-membered aromatic-heterocyclic ring, for example to a monoazine, diazine or triazine ring, in particular a pyridine, pyrimidine, pyridazine, pyrazine, thiazine, oxazine or unsymmetrical or symmetrical triazine ring or to such a ring system containing one or more fused-on aromatic-carbocyclic rings, for example a quinoline, phthalazine, cinnoline, quinazoline, quinoxaline, acridine, phenazine or phenanthridine ring system and to which no further chromophore is attached.

Examples of the reactive substituents on the heterocycle include halogen (Cl, Br or F), ammonium, including hydrazinium, pyridinium, picolinium, carboxypyridinium, sulfonium, sulfonyl, azido (—$N_3$), thiocyanato, thioether, oxyether, sulfinic acid and sulfonic acid.

Individual examples of radicals Z include the following: 2,4-difluorotriazin-6-yl, 2,4-dichlorotriazin-6-yl, monohalo-sym.-triazinyl radicals, in particular monochloro- or monofluorotriazinyl radicals which are substituted by alkyl, aryl, amino, monoalkylamino, dialkylamino, aralkylamino, arylamino, morpholino, piperidino, pyrrolidino, piperazino, alkoxy, aryloxy, alkylthio, arylthio, alkyl preferably being substituted or unsubstituted $C_1$–$C_4$-alkyl, aralkyl preferably being substituted or unsubstituted phenyl-$C_1$–$C_4$-alkyl and aryl preferably being substituted or unsubstituted phenyl or naphthyl (preferred substituents for alkyl being halogen, hydroxy, cyano, dialkylamino, morpholino, $C_1$–$C_4$-alkoxy, carboxy, sulfo or sulfato, and preferred substituents for phenyl and naphthyl being sulfo, $C_1$–$C_4$-alkyl, $C_1$–$C_4$-alkoxy, carboxy, halogen, acylamino, hydroxy and amino), furthermore the radicals 2-amino-4-fluorotriazin-6-yl, 2-methylamino-4-fluorotriazin-6-yl, 2-ethylamino-4-fluorotriazin-6-yl, 2-isopropylamino-4-fluorotriazin-6-yl, 2-dimethylamino-4-fluorotriazin-6-yl, 2-diethylamino-4-fluorotriazin-6-yl, 2-β-methoxyethylamino-4-fluorotriazin-6-yl, 2-β-hydroxyethylamino-4-fluorotriazin-6-yl, 2-di-(β-hydroxyethylamino)-4-fluoro-triazin-6-yl, 2-carboxymethylamino-4-fluorotriazin-6-yl, 2-di-(carboxymethylamino)-4-fluorotriazin-6-yl, 2-sulfomethylmethylamino-4-fluorotriazin-6-yl, 2-β-cyanoethylamino-4-fluorotriazin-6-yl, 2-benzylamino-4-fluorotriazin-6-yl, 2-β-phenylethylamino-4-fluorotriazin-6-yl, 2-benzyl-methylamino-4-fluorotriazin-6-yl, 2-(4'-sulfobenzyl)amino-4-fluorotriazin-6-yl, 2-cyclohexylamino-4-fluorotriazin-6-yl, 2-(o-, m- and p-methylphenyl)-amino-4-fluorotriazin-6-yl, 2-(o-, m- and p-sulfophenyl)amino-4-fluoro-triazin-6-yl, 2-(2',5'-disulfophenyl)amino-4-fluorotriazin-6-yl, 2-(o-, m- and p-chlorophenyl)amino-4-fluorotriazin-6-yl, 2-(o-, m- and p-methoxyphenyl)-amino-4-fluorotriazin-6-yl, 2-(2'-methyl-4'-sulfophenyl)amino-4-fluoro-triazin-6-yl, 2-(2'-methyl-5'-sulfophenyl)amino-4-fluorotriazin-6-yl, 2-(2'-chloro-4'-sulfophenyl)amino-4-fluorotriazin-6-yl, 2-(2'-chloro-5'-sulfophenyl)-amino -4-fluorotriazin-6-yl, 2-(2'-methoxy-4'-sulfophenyl)amino-4-fluoro-triazin-6-yl, 2-(o-, m- and p-carboxyphenyl)amino-4-fluorotriazin-6-yl, 2-(2', 4'-disulfophenyl)amino-4-fluorotriazin-6-yl, 2-(3',5'-disulfophenyl)-amino-4-fluorotriazin-6-yl, 2-(2'-carboxy-4'-sulfophenyl)amino-4-fluoro-triazin-6-yl, 2-(2'-carboxy-5'-sulfophenyl)amino-4-fluorotriazin-6-yl, 2-(6'-sulfonaphth-2'-yl)amino-4-fluorotriazin-6-yl, 2-(4',6'-disulfonaphth-2'-yl)-amino-4-fluorotriazin-6-yl, 2-(6',8'-disulfonaphth-2'-yl) amino-4-fluorotriazin-6-yl, 2-(N-methyl-N-phenyl)amino-4-fluorotriazin-6-yl, 2-(N-ethyl-N-phenyl)amino-4-fluorotriazin-6-yl, 2-(N-β-hydroxyethyl-N-phenyl)amino-4-fluorotriazin-6-yl, 2-(N-isopropyl-N-phenyl)amino-4-fluorotriazin-6-yl, 2-morpholinoamino-4-fluorotriazin-6-yl, 2-piperidino-4-fluorotriazin-6-yl, 2-(4',6',8'-trisulfonaphth-2'-yl)-amino-4-fluorotriazin-6-yl, 2-(3',6',8'-trisulfonaphth-2'-yl)amino-4-fluorotriazin-6-yl, 2-(3',6'-disulfonaphth-1'-yl)-amino-4-fluorotriazin-6-yl, N-methyl-N -(2,4-dichlorotriazin-6-yl)carbamyl, N-methyl-N-(2-dimethylamino-4-chlorotriazin-6-yl)carbamyl, N-methyl- and N-ethyl-N-(2,4-dichlorotriazin-6-yl)aminoacetyl, 2-methoxy-4-fluorotriazin-6-yl, 2-ethoxy-4-fluorotriazin-6-yl, 2-phenoxy-4-fluorotriazin-6-yl, 2-(o-, m- and p-sulfophenoxy)-4-fluorotriazin-6-yl, 2-(o-, m- and p-methyl- or -methoxy-phenoxy)4-fluorotriazin-6-yl, 2-β-hydroxyethylmercapto-4-fluorotriazin-6-yl, 2-phenylmercapto-4-fluorotriazin-6-yl, 2-(4'-methylphenyl) mercapto-4-fluorotriazin-6-yl, 2-(2',4'-dinitrophenyl) mercapto-4-fluorotriazin-6-yl, 2-methyl-4-fluorotriazin-6-yl, 2-phenyl-4-fluorotriazin-6-yl and their corresponding 4-chloro- and 4-bromotriazinyl derivatives and the corresponding radicals obtainable by halogen exchange with tertiary bases, such as trimethylamine, triethylamine, dimethyl-β-hydroxyethyl-amine, triethanolamine, N,N-dimethylhydrazine, pyridine, α, β- or γ-picoline, nicotinic acid or isonicotinic acid, and with sulfinates, in particular benzenesulfinic acid or hydrogen sulfite, furthermore di- or tri-halopyrimidinyl radicals, such as 2,4-dichloropyrimidin-6-yl, 2,4,5-trichloropyrimidin-6-yl, 4,5-dichloropyrimidin-6-yl, 2,4-difluoropyrimidin-6-yl, 4,5-difluoropyrimidin-6-yl, 4-fluoro-5-chloropyrimidin-6-yl, 2,4-difluoro-5-chloropyrimidinyl, furthermore 2,3-dichloroquinoxaline-5-carbonyl and 2,3-dichloroquinoxaline-6-carbonyl.

Of the fiber-reactive radicals of the formula (1), preference is given to those dyes in which D is the radical of a formula (4a), (4b), (4c) or (4d)

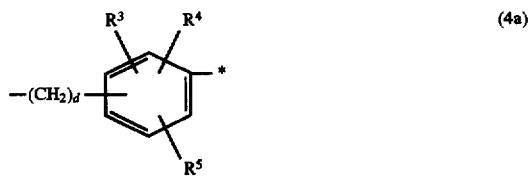

(4a)

-continued

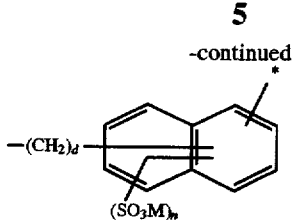

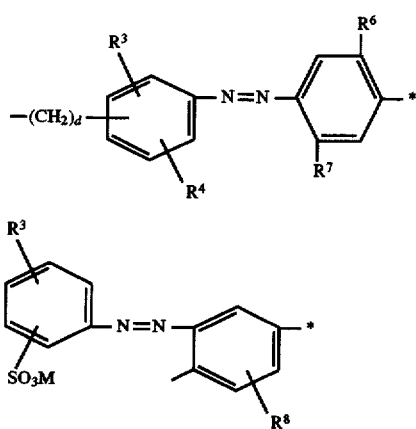

in which
d is zero or 1,
R³ is hydrogen or sulfo,
R⁴ is hydrogen or sulfo,
R⁵ is hydrogen, methyl, ethyl or methoxy,
n is zero, 1, 2 or 3 (where, if n is zero, this group is hydrogen),
M has the abovementioned meaning,
R⁶ is hydrogen, alkyl having 1 to 4 carbon atoms, such as methyl and ethyl, alkoxy having 1 to 4 carbon atoms, such as methoxy and ethoxy, hydroxy or sulfo,
R⁷ is hydrogen, alkyl having 1 to 4 carbon atoms, such as methyl and ethyl, alkoxy having 1 to 4 carbon atoms, such as methoxy and ethoxy, acylamino, such as, in particular, alkanoylamino having 2 to 5 carbon atoms, such as acetylamino and propionylamino, alkylsulfonylamino having 1 to 4 carbon atoms, such as methylsulfonylamino and ethylsulfonylamino, or ureido, and
R⁸ is hydrogen, methyl, ethyl or methoxy,
Y, Z, R¹ and R² have one of the abovementioned meanings, and
K is a radical of the formula (2a) or (2b)

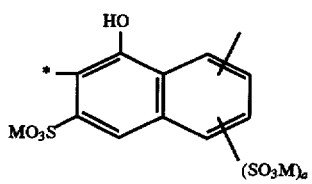

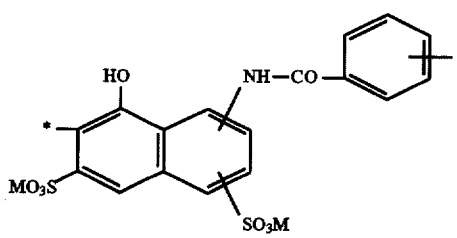

in which M, a and * have the abovementioned meanings, and, in formula (2a), the group —SO₃M is preferably in the 6 position and the free bond preferably in the 8 position if a is 1 and the free bond is preferably in the 6 or 7 position of the 1-hydroxynaphthalene radical if a is zero, and, in formula (2b), one sulfo group is preferably attached to the 1-hydroxynaphthalene radical in the 6 position and the phenylenecarbonylamino group preferably in the 8 position.

In the dyes of the formula (1), the radical Y is preferably a radical of the formula (3a)

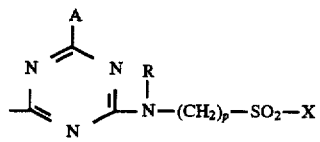

in which

A is amino, cyanoamino, phenoxy, methoxy, ethoxy, morpholino, pyrrolidino, piperazino, piperidino, 3-carboxypyridinyl, 3-aminocarbonylpyridinyl, alkylamino of 1 to 4 carbon atoms which may be substituted by 1 or 2 substituents selected from the group consisting of sulfo, carboxy, methyl, ethyl, methoxy and ethoxy, dialkylamino having alkyl radicals of 1 to 4 carbon atoms, one of which may be substituted by 1 or 2 substituents selected from the group consisting of sulfo, carboxy, methyl, ethyl, methoxy and ethoxy, such as (β-sulfoethyl)amino and N-methyl-N-(β-sulfoethyl)amino, phenylamino or phenylamino which is substituted by 1 or 2 substituents selected from the group consisting of sulfo, carboxy, R is hydrogen, methyl, ethyl, phenyl or phenyl which is substituted by 1 or 2 substituents selected from the group consisting of methyl, ethyl and sulfo, preferably hydrogen, methyl or phenyl, p is 2 or 3, and X is vinyl, β-chloroethyl or β-sulfatoethyl.

Preference is given in particular to fiber-reactive azo dyes of the formula (1) in which Y is a radical of the formula (3b)

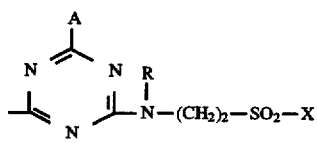

in which

A is methoxy, cyanoamino, morpholino, 3-carboxypyridinyl or (β-sulfoethyl)amino, R is phenyl, and X is vinyl or (β-sulfatoethyl).

Of the fiber-reactive azo dyes according to the invention, further preference is given to those in which Z is a fiber-reactive fluorine-containing pyrimidin-6-yl radical or a radical of the formula (5)

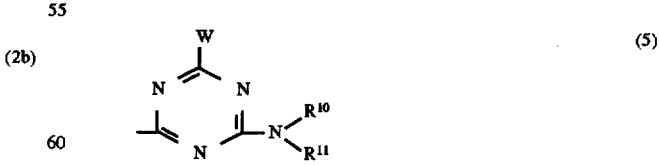

in which

W is chlorine, fluorine or an unsubstituted or substituted, such as, for example, a carboxy- or sulfo-substituted, pyridinium radical, R¹⁰ is hydrogen, alkyl having 1 to 4 carbon atoms, substituted alkyl having 1 to 4 carbon atoms (such as, for example, by halogen, cyano, alkoxy having 1 to 4 carbon atoms, carboxy, sulfo, sulfato, hydroxy, phenyl or phenyl which is substituted by substituents selected from the group consisting of chlorine, methyl, ethyl, methoxy, ethoxy, sulfo and carboxy), such as benzyl and phenethyl, cycloalkyl having 5 or 6 carbon atoms, such as cyclohexyl, phenyl, naphthyl or substituted phenyl or naphthyl, such as phenyl or naphthyl which is substituted, for example, by substituents selected from the group consisting of halogen, nitro, cyano, trifluoromethyl, sulfamoyl, carbamoyl, alkyl having 1 to 4 carbon atoms, alkoxy having 1 to 4 carbon atoms, alkanoylamino having 2 to 5 carbon atoms, benzoylamino, ureido, hydroxy, carboxy, sulfomethyl and sulfo, preferably selected from the group consisting of chlorine, methyl, ethyl, methoxy, ethoxy, sulfo and carboxy.

$R^{11}$ has one of the meanings given for $R^{10}$, or the group —$NR^{10}R^{11}$ is N-morpholino, N-piperidino or N-piperazino.

Of the dyes of the formula (1), preference is given in particular to those of the formula (1a)

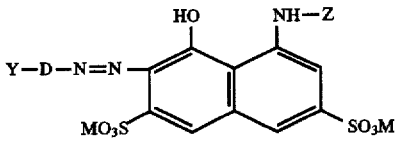

(1a)

in which Y, D, M and Z have one of the abovementioned, in particular the preferred, meanings and Z is particularly preferably the 2-fluoro-4-(N-morpholino)-1,3,5-triazin-6-yl radical.

Of the fiber-reactive azo dyes of the formula (1) according to the invention, further mention may be made of those having the formulae (1A) to (1N)

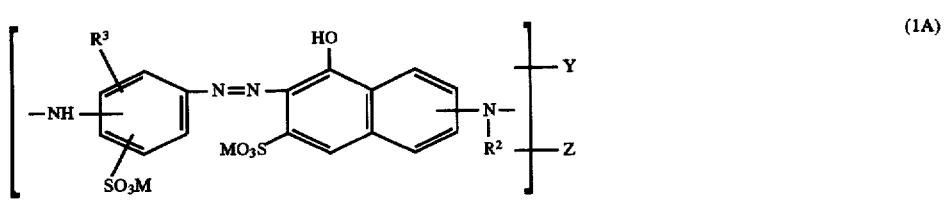

(1A)

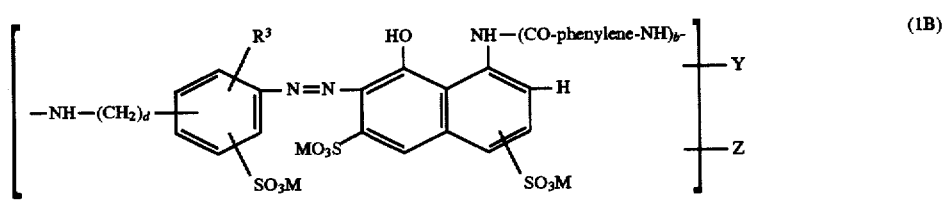

(1B)

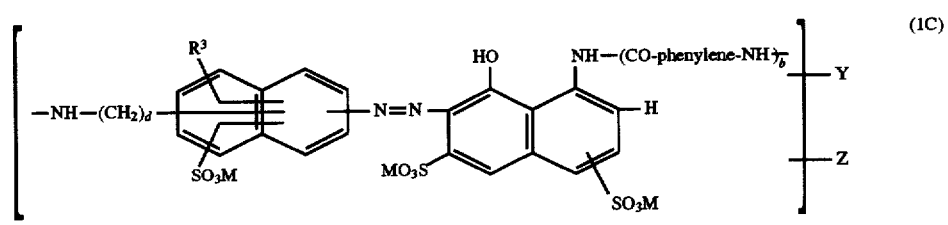

(1C)

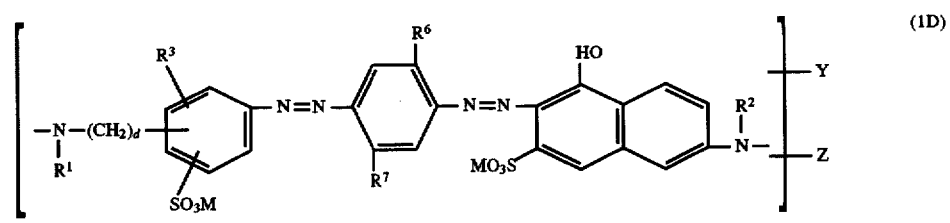

(1D)

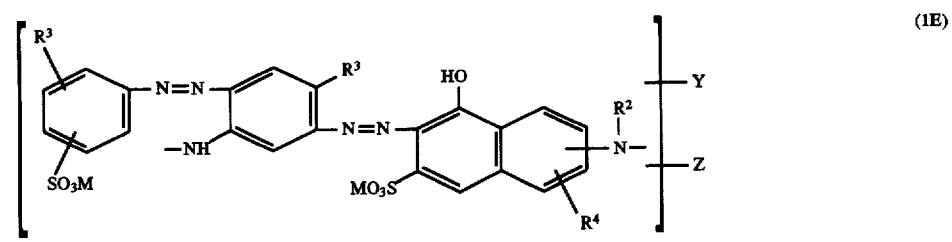

(1E)

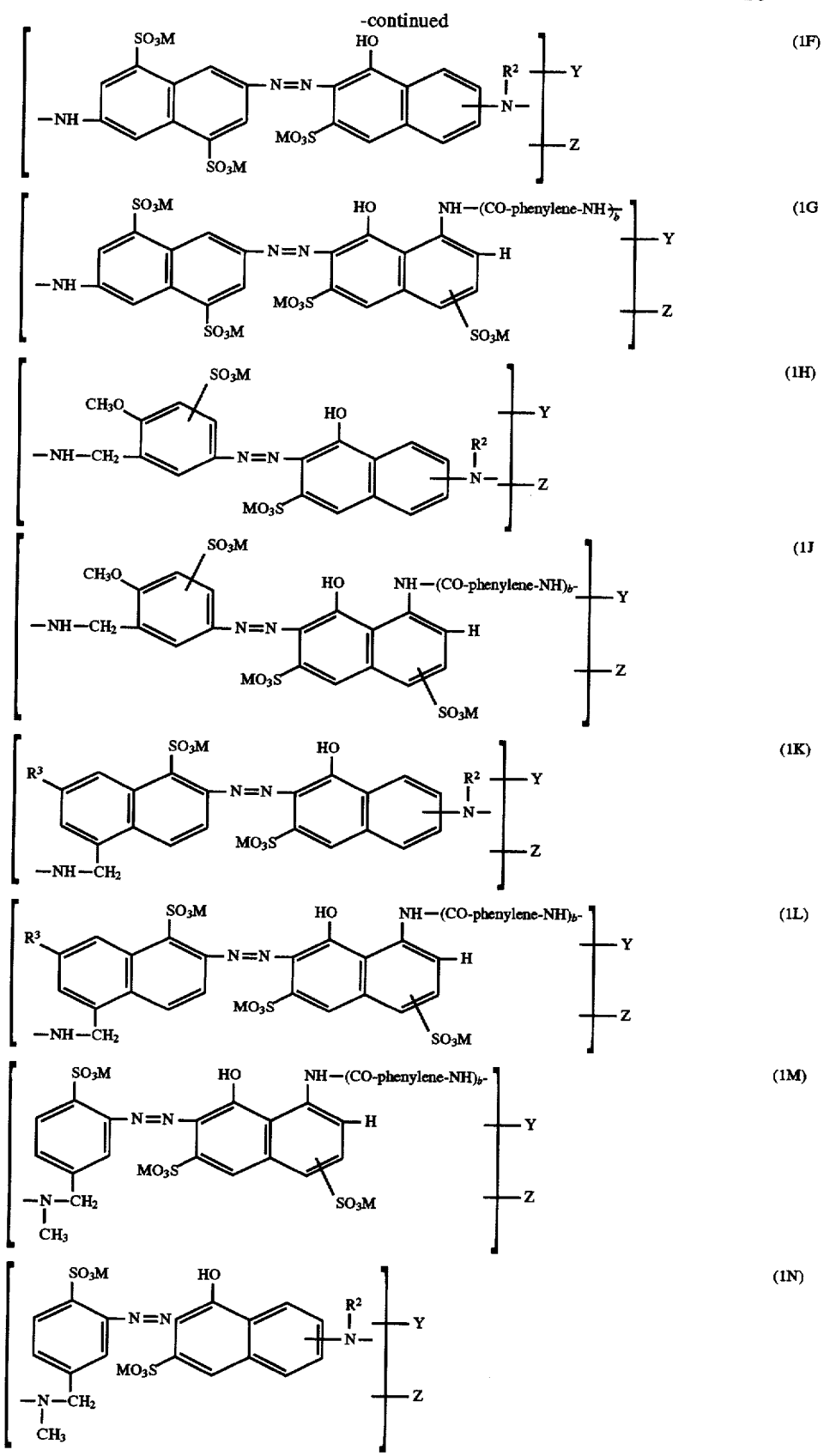

in which

Y and Z alternatively are attached to the amino groups containing the free bond and have one of the abovementioned, in particular preferred, meanings, $R^2$ is hydrogen, methyl or ethyl, M, $R^3$, b, d, $R^1$, $R^6$ and $R^7$ have the abovementioned, in particular preferred, meanings.

Of the azo dyes according to the invention, in particular those may be mentioned as being preferred which have the formulae (6) and (7)

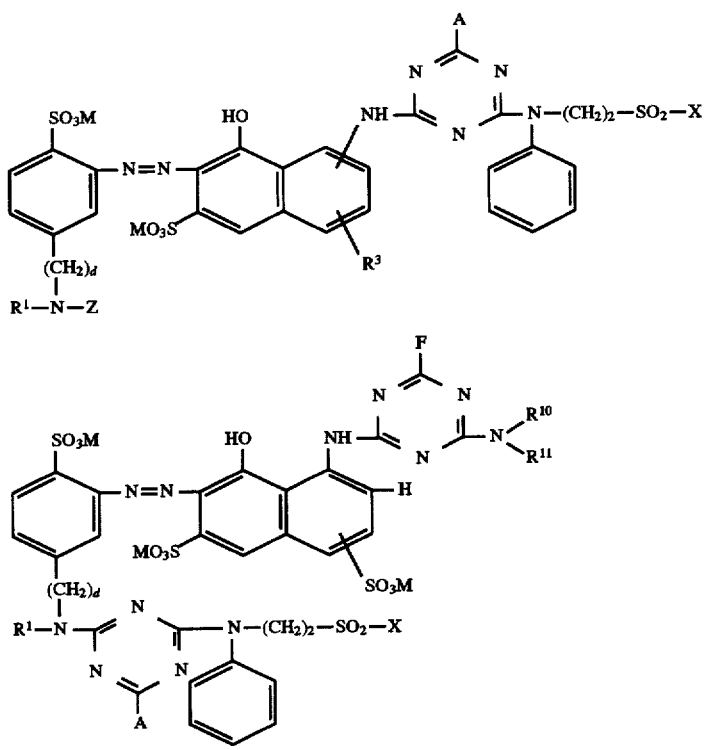

in which

M, d, $R^3$, $R^{10}$ and $R^{11}$ have the abovementioned, in particular preferred, meanings.

X is vinyl and, preferably, β-sulfatoethyl, $R^1$ is hydrogen, methyl or ethyl,

A is amino, cyanoamino, methoxy, phenoxy, sulfophenylamino, (β-sulfatoethyl)amino, 3-carboxypyridinyl or 3-aminocarbonylpyridinyl.

Of the compounds according to the invention, further preference is given to those in which Z is a triazine radical of the formula (3b) in which W is fluorine and the amino group —$NR^{10}R^{11}$ has the following meaning:

amino, N-morpholino, N-(β-hydroxyethyl)amino, N,N-di (β-hydroxyethyl)-amino, β-sulfoethylamino, phenylamino, phenylamino which is substituted on the phenyl ring by 1 or 2 substituents selected from the group consisting of chlorine, methyl, ethyl, methoxy, ethoxy, acetylamino, hydroxy, carboxy, sulfomethyl and sulfo, N-($C_1$-$C_4$-alkyl) phenylamino, N-($C_1$-$C_4$-alkyl)phenylamino which is substituted on the phenyl ring by 1 or 2 substituents selected from the group consisting of chlorine, methyl and ethyl, N-(sulfo-$C_1$-$C_4$-alkyl)phenylamino, N-(sulfo-$C_1$-$C_4$-alkyl) phenylamino which is substituted on the phenyl ring by 1 or 2 substituents selected from the group consisting of chlorine, methyl and ethyl, N-(hydroxy-$C_1$-$C_4$-alkyl)-phenylamino and sulfonaphthylamo.

The invention furthermore provides processes for preparing the fiber-reactive azo dyes of the formula (1), which comprise reacting an azo compound of the formula (8)

$$\begin{array}{ccc} R^1 & & R^2 \\ | & & | \\ H-N-D-N=N-K-N-H \end{array} \quad (8)$$

in which $R^1$, $R^2$, D and K have the abovementioned meanings, in any desired order with one mole equivalent each of a compound of the formula Z-Hal in which Z has the abovementioned meaning and Hal is halogen, such as bromine and, in particular, chlorine or fluorine, and with a compound of the formula (9)

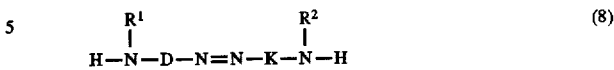

in which A, Hal, R, G, c, B and X have the abovementioned meanings, or reacting a compound of the formula (8) in any desired order with one mole equivalent each of a compound of the formula Z-Hal defined above and a compound of the formula (10)

$$\begin{array}{c} Hal \\ \diagdown \\ N \quad\quad N \quad R \\ \| \quad\quad \| \quad | \\ Hal\diagup\quad\diagdown N-(G)_c-B-SO_2-X \\ N \end{array} \quad (10)$$

in which Hal, R, G, c, B and X have the abovementioned meanings, and reacting the compound thus obtained of the formula (11)

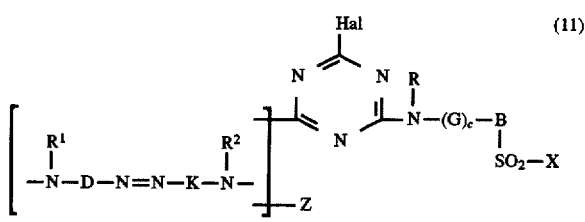

in which $R^1$, $R^2$, D, K, Hal, R, G, c, B, X and Z have the abovementioned meanings, with a compound of the formula H-A where A has the abovementioned meaning, or reacting compounds of the formulae (12) and (13)

$$R^1\text{—NH—D—NH}_2 \quad (12)$$

$$H\text{—K—NH—}R^2 \quad (13)$$

in which $R^1$, D, K and $R^2$ have the abovementioned meanings alternatively with one mole equivalent each of a compound of the formula (9) and a compound of the formula Z-Hal and diazotizing the compound thus obtained of the formula (14a) or (14b)

$$\underset{\underset{\text{Z—N—D—NH}_2}{|}}{R^1} \quad (14a)$$

$$\underset{\underset{\text{Y—N—D—NH}_2}{|}}{R^1} \quad (14b)$$

in which Z, Y, $R^1$ and D have the abovementioned meanings, and coupling the resulting diazonium salt compound onto the compound of the formula (15a) or (15b)

$$\underset{\underset{\text{H—K—N—Y}}{|}}{R^2} \quad (15a)$$

$$\underset{\underset{\text{H—K—N—Z}}{|}}{R^2} \quad (15b)$$

which K, $R^2$, Y and Z have the abovementioned meanings in the usual manner and then, if desired, carrying out further transformation reactions in the resulting azo dyes of the formula (1) according to the invention to give other azo dyes of the formula (1) according to the invention.

The starting compounds of the formula (12) can initially also contain a protective acyl group on the amino radical of the formula $R^1$—NH—, such as, for example, an acetyl group, which, after diazotization and coupling in the usual manner, can be hydrolyzed to give the group $R^1$—NH— and to enable its reaction with a halotriazine, halopyrimidine or the like.

Since the individual abovementioned process steps can be carried out in a different order, different process variants are possible. In general, the reactions are carried out stepwise in succession, the order of the simple reactions between the individual reaction components advantageously depending on the particular conditions.

Since under certain conditions hydrolysis of a halotriazine or halopyrimidine radical will take place, an intermediate containing acetylamino groups must be hydrolyzed to eliminate the acetyl groups before it is condensed with an aminofluorotriazine or trifluorotriazine or the like. An example of a further suitable transformation reaction is the subsequent reaction of a dihalotriazinyl radical with an amine. Which reaction is advantageously carried out first when preparing a secondary condensation product from an amine $HNR^{10}R^{11}$, 2,4,6-trihalo-s-triazine and diaminobenzenesulfonic acid, that of the trihalotriazine with the amine or with the diaminobenzenesulfonic acid, differs from case to case and depends in particular on the solubility of the amino compounds involved and the basicity of the amino groups to be acylated. The most important process variants are described in the Working Examples.

Examples of suitable starting compounds of the formula (12) for preparing the azo dyes according to the invention are:

1,3-diaminobenzene, 1,4-diaminobenzene, 1,3-diamino-4-methylbenzene, 1,3-diamino-4-ethylbenzene, 1,3-diamino-4-methoxybenzene, 1,3-diamino4-ethoxybenzene, 1,4-diamino-2-methylbenzene, 1,4-diamino-2-methoxybenzene, 1,4-diamino-2-ethoxybenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,4,5,6-tetramethylbenzene, 1,3-diamino-4-nitrobenzene, 4,4'-diaminostilbene, 4,4'-diaminodiphenylmethane, 2,6-diaminonaphthalene4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene4-sulfonic acid, 1,3-diaminobenzene-4,6-disulfonic acid, 1,4-diamino-2-methylbenzene-5 sulfonic acid, 1,5-diamino-6-methylbenzene-3-sulfonic acid 1,3-diamino6-methylbenzene4-sulfonic acid, 3-(3'- and 4'-aminobenzoylamino)-1-aminobenzene6-sulfonic acid, 1-(4'-aminobenzoylamino)4-aminobenzene-2,5-disulfonic acid, 1,4-diaminobenzene-2-carboxylic acid, 1,3-diaminobenzene4-carboxylic acid, 1,2-diaminobenzene-4-carboxylic acid, 1,3-diaminobenzene-5-carboxylic acid, 1,4-diamino-2-methylbenzene, 4,4'-diaminodiphenyl oxide, 4,4'-diamino-2,2'-disulfodiphenylurea, 4,4'-diamino-2,2'-disulfodiphenyloxyethane, 4,4'-diamino-2,2'-disulfostilbene, 4,4'-diamino-2,2'-disulfodiphenyl-ethane, 2-amino-5-aminomethylnaphthalene-1-sulfonic acid, 2-amino-5-aminomethyinaphthalene-1,7-disulfonic acid, 1-amino4-methoxy-5-aminomethylbenzene6-sulfonic acid, 1-amino-3-(N-methyl)aminomethyl-benzene-6-sulfonic acid, 1-amino4-(N-methyl)aminomethylbenzene-3-sulfonic acid, 1-amino-4-aminomethylbenzene-3-sulfonic acid, 1,3-diaminobenzene-4-(azophenyl-4'-sulfonic acid), 1,3-diamino-4-(azophenyl-2',4'-disulfonic acid, 1,3-diaminobenzene-6-sulfo-4-(azophenyl4'-sulfonic acid) and 1,3-diamino-6-sulfo-4-(azophenyl-3',6'-disulfonic acid).

If, instead of diamino compounds of this type, the starting compound used is an aminoacetylamino compound whose acetyl group is again eliminated later on by hydrolysis, as mentioned above, suitable compounds are the monoacetyl compounds of the diamino compounds of the formula (12), such as, for example, 1-acetylamino-3-aminobenzene4-sulfonic acid or 1 -acetylamino-4-aminobenzene-3-sulfonic acid.

Examples of starting compounds of the formula (13) are:
1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 2-amino-5-hydroxynaphthalene-1,7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or 2-ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- and -4,6-disulfonic acid, 1-acetylamino-8-hydroxynaphthalene-3,6- and -4,6-disulfonic acid, 1-(4'-aminobenzoylamino)-8-hydroxynaphthalene-3,6- and -4,6-disulfonic acid, 1-(4'-nitrobenzoylamino)-8-hydroxynaphthalene-3,6- and -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- and -4,6-disulfonic acid and 1-amino-8-hydroxynaphthalene-4-sulfonic acid.

Diazotization of the diazo components or the intermediates containing a diazotizable amino group is usually carried out by reaction with nitrous acid in aqueous mineral acid solution at low temperature, such as at −10° C. to +10° C. Coupling onto the coupling component takes place at a weakly acidic, neutral to weakly alkaline pH, such as at a pH between 4 and 8, and at a temperature of at about between 10° and 30° C.

Condensation of the reactive components with the diazo components and the coupling components and with the amines or with acylatable monoazo or disazo intermediates or with the amino-containing dyes is preferably carried out in aqueous solution or suspension at 0° C. to 80° C. and at a weakly acidic, neutral to weakly alkaline pH, such as, for example, at a pH between 4 and 8. Advantageously, the hydrogen halide released during condensation is continuously neutralized by addition of aqueous alkali metal hydroxides, alkali metal carbonates or alkali metal bicarbonates.

The azo dyes of the formula (1) according to the invention are suitable for dyeing and printing natural or synthetic hydroxy- or carboxamido-containing materials, such as silk, leather, wool, synthetic polyamide fibers, but in particular cellulose-containing materials of fibrous structure, such as linen, cellulose, regenerated cellulose, chemically modified cellulose, such as aminated cellulose, and especially cotton. They are not only suitable for the exhaust method but also for dyeing by customary pad-dyeing methods, in which the goods are impregnated with aqueous and, if desired, also salt-containing dye solutions in order to fix the dyes on the fiber material by means of an alkali treatment or in the presence of alkali, if desired with application of heat.

The dyes of the formula (1) are distinguished by high reactivity and excellent fixation properties. Their multifunctionality results in high fixation yields even from a strong liquor. Their characteristic feature is that the yield is relatively independent of the dyeing temperature, which makes it possible to use them in the exhaust method at low to moderate dyeing temperature. When used in the pad-steam method, they require only short steaming times. They produce dyeings having high color strength and good light and wet fastness properties.

The Examples which follow are intended to illustrate the invention. Parts and percentages are by weight unless stated otherwise. Parts by weight relate to parts by volume as the kilogram relates to the liter.

The compounds described in the Examples by way of their formulae are given in the form of the free acids. In general, they are prepared and isolated in the form of their alkali metal salts, such as lithium salts, sodium salts or potassium salts, and used for dyeing in the form of their salts. Likewise, the starting compounds and components mentioned in the Examples below, in particular the Table Examples, in the form of the free acid can be used in the synthesis as such or in the form of their salts, preferably their alkali metal salts.

The absorption maxima ($\lambda_{max}$) given for the compounds according to the invention in the visible region were determined using their alkali metal salts in aqueous solution. In the Table Examples, the $\lambda_{max}$ values are written in parentheses next to the shade, and the wavelengths are given in nm.

EXAMPLE 1

A) 0.15 mol of the compound of the formula

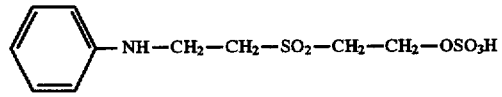

are stirred in 100 g of water and 100 g of ice and dissolved under neutral conditions. 0.165 mol of 2,4,6-trifluoro-1,3,5-triazine are slowly added at about 0° C. and a pH of 4 to 4.5 over a period of 10 minutes to give about 250 g of an aqueous solution (solution A) of the condensation product of the following structure:

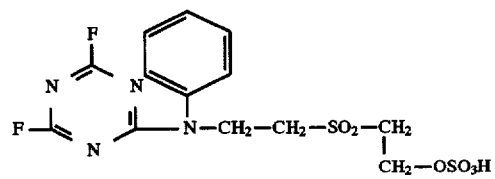

B) 0.13 mol of 2,4-diaminobenzenesulfonic acid are suspended in 150 ml of water and dissolved at a pH of 7 to 8 using sodium carbonate solution. This solution is added dropwise to the above condensation solution (solution A) at a pH of 6 to 6.5, during which the temperature rises to 15° to 18° C. This is followed by addition of 0.2 mol of cyanamine and stirring for a while at a pH of 6.5 and at 40° to 45° C. until reaction is complete to give about 450 g of an aqueous solution (solution B) of the condensation product of the following structure:

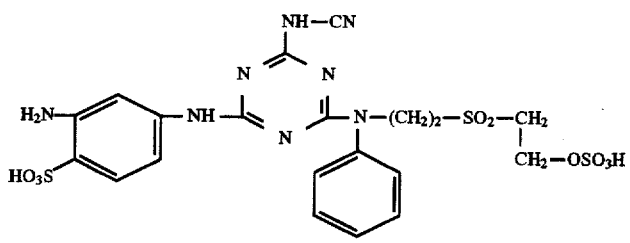

C) 0.15 mol of 1-amino-8-hydroxynaphthalene-3,6-disulfonic acid is dissolved in 250 ml of water at a pH of 6.5, and the resulting solution is cooled to 0° C. with 250 g of ice. 0.16 mol of 2,4,6-trifluoro-1,3,5-triazine (cyanuric fluoride) is added, and the pH is maintained between 3.5 and 4 with $Na_2CO_3$ solution. After 5 minutes, 0.15 mol of morpholine is added, and the pH is brought to 7 with sodium carbonate solution. During this period, the temperature rises to about 10° C.

D) The condensation product from B) (solution B) is diazotized at 0° C. and a pH of 3 to 3.5, and the resulting diazonium salt solution is added to the solution of coupling component C). The pH is brought to 6 to 7 with sodium carbonate solution. After coupling is complete, the dye is salted out, isolated, dried and milled.

Written in the form of the free acid, it has the formula

B) A neutral solution of 0.13 mol of 2,4-diaminobenzenesulfonic acid is slowly added to this condensation solution while maintaining the pH between 6.5 and 7 with aqueous sodium carbonate solution. This is followed by addition of 0.18 mol of 3-carboxypyridine and stirring of the batch for a while at 80° to 90° C. and a pH between 4 and 5 until reaction is complete.

C) The resulting compound of the formula (written in the form of the free acid)

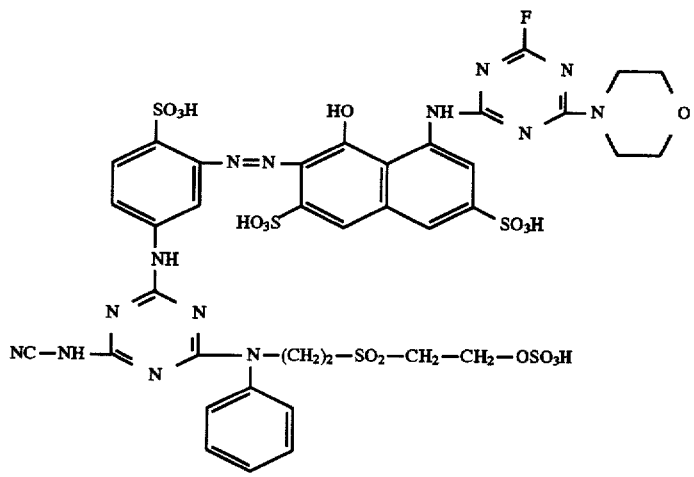

exhibits absorption maxima in the visible region at 514 and 533 nm, and dyes cotton in clear red shades.

EXAMPLE 2

A) 0.15 mol of the compound N-phenyl-N-[β(β'-sulfatoethylsulfonyl)-ethyl]amine is stirred in 150 g of water and 150 g of ice and dissolved under neutral conditions. 0.155 mol of 2,4,6-trichloro-1,3,5-triazine (cyanuric chloride) is added dropwise at 0° C. and a pH between 5 and 5.5 over a period of 10 minutes to give about 350 g of an aqueous solution of the compound 2,4-dichloro6-{N-phenyl-N-[β-(β'-sulfatoethylsulfonyl)ethyl]}amino-1,3,5-triazine.

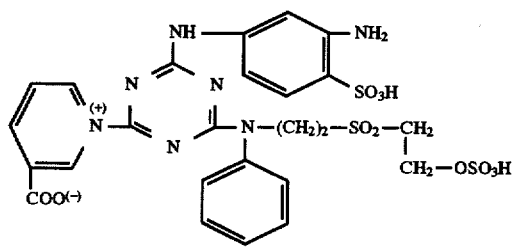

is diazotized in the usual manner at 0° C. and a pH between 3 and 3.5, and the resulting diazonium salt solution is added to the solution of the coupling component described in Example 1C, and coupling is carried out while maintaining the pH between 6 and 7 to give the azo compound of the formula (written in the form of the free acid) according to the invention which dyes, for example, cotton in clear red shades.

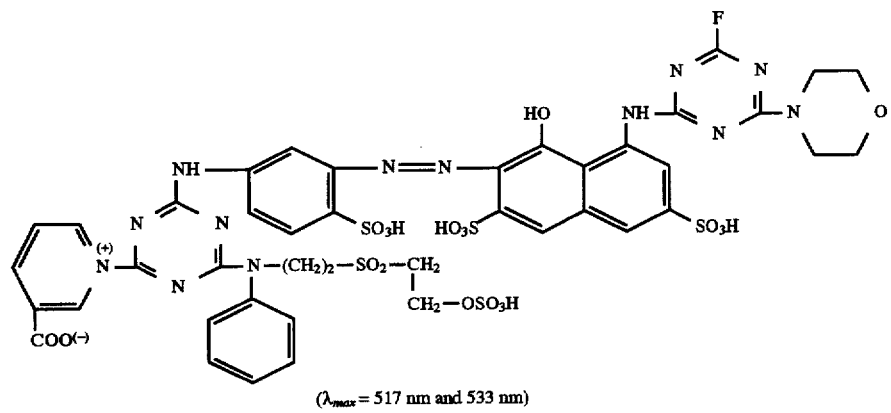

($\lambda_{max}$ = 517 nm and 533 nm)

The dye is salted out by precipitating it with about 15% by volume of sodium chloride, relative to the volume of the synthesis solution, isolated and dried. It produces clear red dyeings, for example on cotton, by the application methods customary for fiber-reactive dyes.

EXAMPLE 3 a) 0.15 mol of 1-amino-8-hydroxynaphthalene-3,6-disulfonic acid is dissolved in 250 ml of water at a pH of 6.5, and the resulting solution is cooled to 0° to 5° C. with 200 g of ice. The solution is poured into a suspension of 0.16 mol of 2,4,6-trichloro-1,3,5-triazine in 50 ml of water and 50 g of ice, and the pH is maintained between 3.5 and 4 with NaHCO₃ solution. 0.15 mol of morpholine is then added, and the pH is brought to 7 with sodium carbonate solution.

b) 0.14 mol of a solution prepared by direct diazotization of the condensation product from Example 2B is added to this solution, and the coupling reaction is carried out at a pH of 7 to 7.5. Salting out, isolation and drying give a salt-containing dye of the formula (written in the form of the free acid)

EXAMPLE 4

To prepare an azo compound according to the invention, the procedure of Example 3a) is followed to give the solution of the coupling component.

To prepare the solution of the diazo component, the solution of 2,4-dichloro6{-N-phenyl-N-[β-β'-sulfatoethylsulfonyl)ethyl]}amino-1,3,5-triazine prepared according to Example 2A) is used as the starting compound and reacted with 0.13 mol of 2,4-diaminobenzenesulfonic acid while maintaining the pH between 5 and 6. 0.5 mol of methanol is then added, and the third condensation reaction is brought to completion at a pH between 7 and 7.5 and a temperature between 40° and 50° C.

The diazo component thus obtained of the formula (written in the form of the free acid)

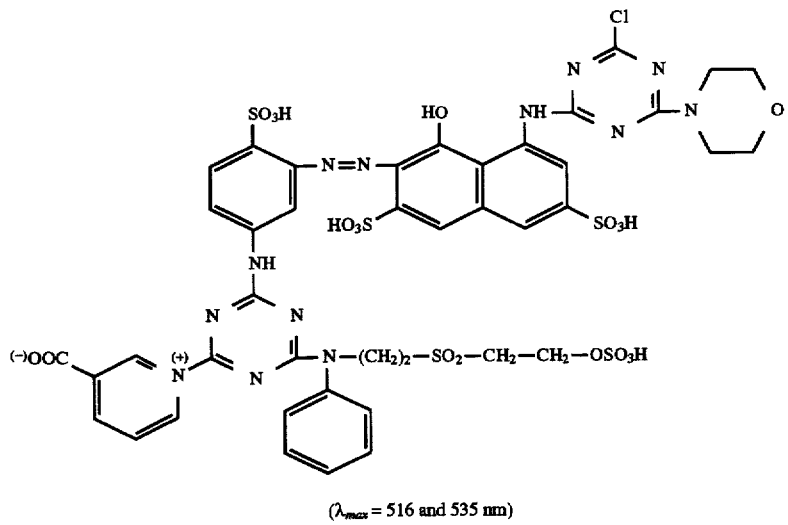

($\lambda_{max}$ = 516 and 535 nm)

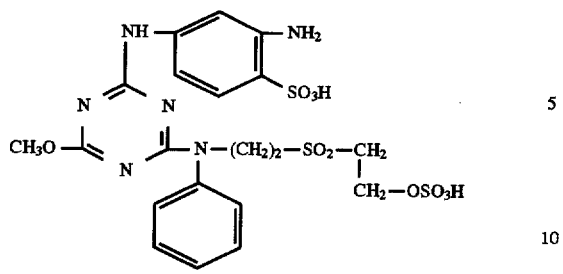

is diazotized in the usual manner, and the resulting diazonium salt solution is added to the solution of the coupling component prepared according to Example 3a. The coupling reaction is carried out at a pH of 7 and a temperature between 20° and 25° C.

The azo dye according to the invention is isolated in the usual manner by salting out. Written in the form of the free acid, it has the formula

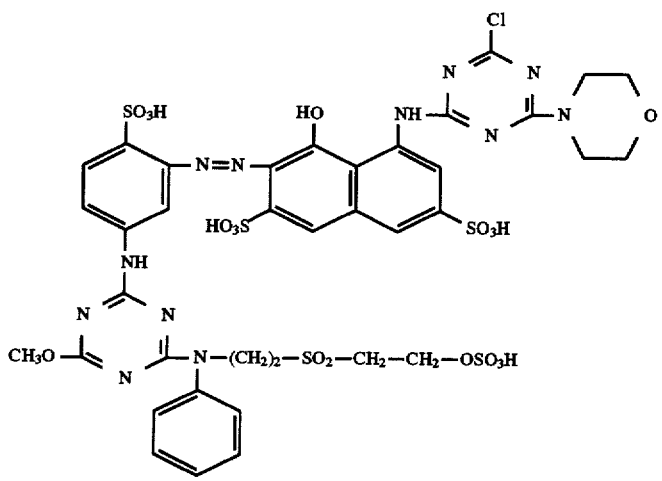

exhibits absorption maxima in the visible region at 516 nm and 535 nm and produces clear red dyeings, for example on cotton, by the application methods customary in the art of fiber-reactive dyes.

EXAMPLE 5

0.2 mol of 1-amino8-hydroxynaphthalene-3,6-disulfonic acid is dissolved in 450 ml of water at a pH between 8 and 9 with the addition of sodium hydroxide solution, and 0.22 mol of 2,4,6-trifluoropyrimidine is added to the resulting solution. The condensation reaction is carried out at a temperature between 35° and 40° C. while maintaining the pH between 4 and 5 by means of aqueous sodium carbonate solution.

The corresponding equivalent amount of the diazonium salt solution prepared according to Example 1B is added to the solution of the coupling component thus prepared, and the coupling reaction is carried out at a pH between 6 and 7 and a temperature of about 15° to 20° C.

This gives the azo dye of the formula (written in the form of the free acid) according to the invention

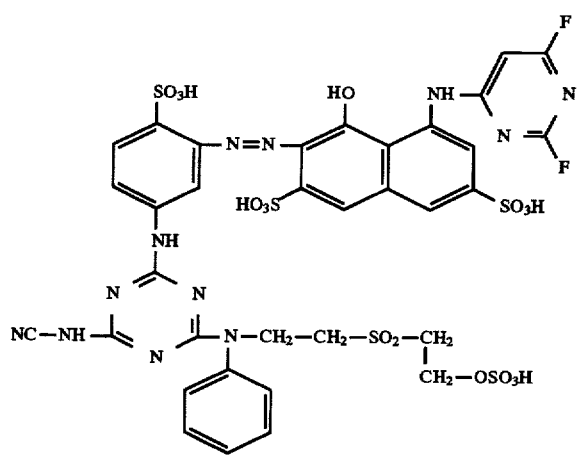

($\lambda_{max}$ = 518 and 539 nm)

which dyes, for example, cotton in red shades by the application methods customary in the art of fiber-reative dyes.

EXAMPLE 6

About 850 ml of an aqueous solution having a pH of 7 and containing about 0.2 mol of 8-(4'-aminobenzoylamino)-1-hydroxynaphthalene-3,6-disulfonic acid are brought to a pH of 4.5 with 10% aqueous hydrochloric acid. 0.2 mol of 2,4,6-trifluoropyrimidine is added, and the reaction is carried out at a temperature of 30° C. and while maintaining a pH of 4.5 to 6 by means of aqueous sodium carbonate solution.

0.2 mol of the diazonium salt solution prepared according to Example 1B is added to the solution of the coupling component thus prepared, and the coupling reaction is carried out at 15° to 20° C. while maintaining the pH between 7.5 and 8 by means of aqueous sodium carbonate solution. The resulting azo dye according to the invention which, written in the form of the free acid, has the formula and containing 0.2 mol of 1-amino-8-hydroxynaphthalene-3,6-disulfonic acid at 35° C., and the reaction is carried out at this temperature and at a pH between 6 and 7.

The equivalent amount of the diazonium salt solution prepared according to Example 1B is added to this solution of the coupling component, and the coupling reaction is carried out at a pH between 6.5 and 7 and a temperature between 15° and 20° C.

The azo dye of the formula (written in the form of the free acid) according to the invention

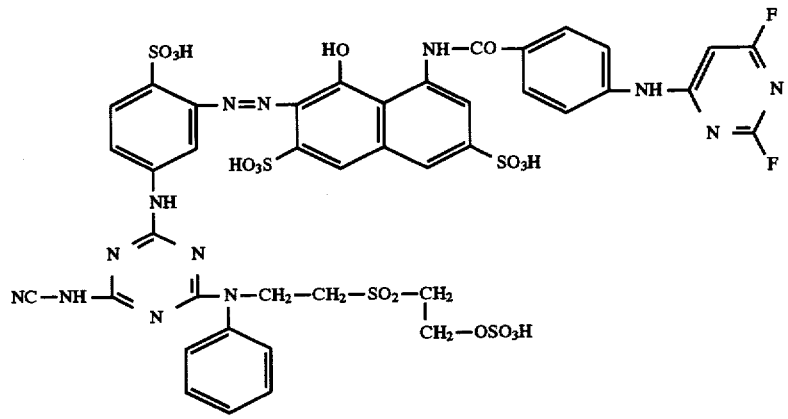

($\lambda_{max}$ = 520 and 539 nm)

is salted out in the usual manner with sodium chloride and isolated. It dyes, for example, cotton in red shades.

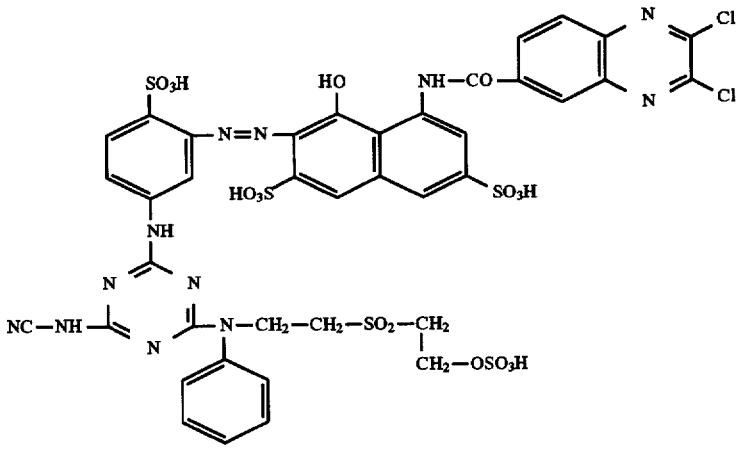

($\lambda_{max}$ = 518 and 538 nm)

EXAMPLE 7

0.21 mol of 2,3-dichloroquinoxaline-6-carbonyl chloride is added to 700 ml of an aqueous solution having a pH of 6.5 is isolated in the usual manner by salting out. It dyes, for example, cotton in red shades.

EXAMPLE 8 a) 500 ml of a solution at 0° to 5° C. having a pH between 6 and 7 and containing 0.3 mol of N-phenyl-N-[β-(β'-sulfatoethylsulfonyl)ethyl]-amine are stirred into a suspension of 0.3 mol of cyanuric chloride, 150 g of water and 100 g of ice while maintaining a pH between 5 and 6 by means of an aqueous 20% sodium carbonate solution. The temperature is maintained at 0° to 1° C. by adding ice in portions. After about two hours, the reaction is complete and the condensation product has completely precipitated.

The suspension is stirred into a solution of 0.2 mol of 1-amino-8-hydroxynaphthalene-3,6-disulfonic acid in 500 ml of water (adjusted to a pH between 5.5 and 6 by means of a 10% aqueous lithium hydroxide solution). The batch is heated to 40° C. and maintained at a pH of 4.5 by means of 20% strength aqueous sodium carbonate solution. After about two hours, reaction is complete. 0.25 mol of cyanamine is then added, and the condensation reaction is carried out at 50° C. and a pH between 6 and 7.

b) 0.2 mol of 3-aminobenzenesulfonic acid are dissolved in 280 ml of water at a pH of 7 with the addition of lithium hydroxide. Addition of 250 g of ice is followed by addition of 0.21 mol of cyanuric fluoride, and the reaction is then carried out while maintaining a pH of 4. A neutral aqueous solution of 2,4-diaminobenzenesulfonic acid is added to the resulting suspension, and the reaction is carried out at a pH between 7 and 7.5 and at 20° C. The reaction batch is then cooled to 0° C., and the product obtained is diazotized in the usual manner, after addition of aqueous hydrochloric acid, by means of an aqueous sodium nitrite solution at a pH between 2 and 2.2. Excess nitrite is destroyed after completion of the diazotization reaction in the usual manner by means of sulfamic acid.

c) The diazonium salt solution prepared according to section b) is poured into the solution of the coupling component prepared according to section a) with stirring. The coupling reaction is carried out at a pH of 5 to 6 and a temperature between 10° and 15° C., and the dye according to the invention is then isolated in the usual manner by salting out with sodium chloride.

Written in the form of the free acid, it has the formula

EXAMPLE 9

0.2 mol of cyanuric chloride is slowly added to 450 ml of an aqueous solution at 0° C. having a pH of 7 and containing 0.22 mol of N-ethylaniline with efficient stirring and while maintaining a pH between 6 and 7 by means of a 20% aqueous sodium carbonate solution. The reaction is complete in about one hour. 350 ml of an aqueous alkaline solution of 0.2 mol of 2,4-diaminobenzenesulfonic acid are then stirred in, and the reaction is carried out at a pH between 6 and 7 and a temperature between 25° and 35° C. After reaction is complete, the batch is cooled to 0° C., 56 ml of 30% hydrochloric acid are added, and the diazotization reaction is carried out in the usual manner, after addition of 56 ml of 30% aqueous hydrochloric acid, by means of a 30% aqueous sodium nitrite solution. After the diazotization reaction is complete, excess nitrous acid is destroyed by means of sulfamic acid. The resulting diazonium salt solution is stirred into the equivalent amount of a solution of the coupling component prepared according to Example 8, and the coupling reaction is carried out at a pH between 7 and 8 and a temperature between 10° and 15° C. After the coupling reaction is complete, the azo dye according to the invention is isolated in the usual manner by salting out. Written in the form of the free acid, it has the formula ($\lambda_{max}$ = 547 nm)

and dyes, for example, cotton in red shades.

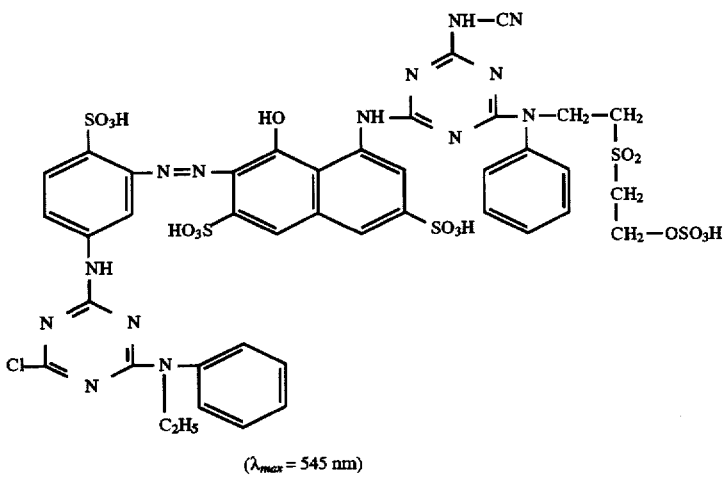

($\lambda_{max}$ = 545 nm)

and dyes, for example, cotton in red shades.

EXAMPLE 10

0.2 mol of 6-fluoro-5-chloro-4-(3'-amino4'-sulfophenyl) aminopyrimidine (prepared in a known manner from 2,4-diaminobenzenesulfonic acid and 4,6-difluoro-5-chloropyrimidine) is suspended in 1000 ml of water, and 65 ml of 30% aqueous hydrochloric acid and 300 g of ice are added. This is followed by addition of 46 ml of a 30% aqueous sodium nitrite solution with efficient stirring, and stirring is continued at 0° C. for another hour. Excess nitrous acid is then destroyed using sulfamic acid.

The diazonium salt solution thus obtained is added to the solution of the coupling component prepared according to Example 8, and the coupling reaction is completed at 10° to 15° C. while maintaining a pH between 7 and 8. The dye according to the invention is isolated in the usual manner. Written in the form of the free acid, it has the formula

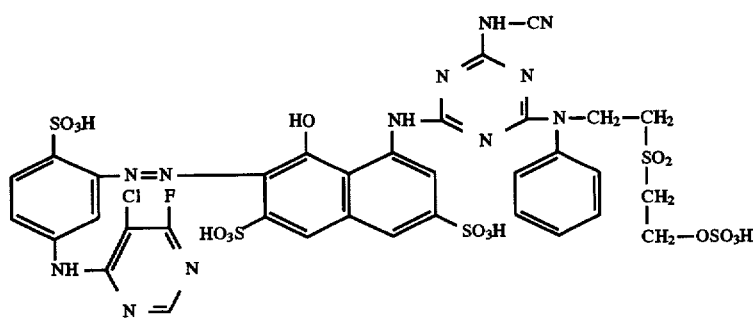

($\lambda_{max}$ = 514 nm and 534 nm)

and dyes, for example, cotton in red shades.

EXAMPLES 11 TO 129

In the Table Examples below, further azo dyes of the formula $D^0$—N=N—$K^0$ according to the invention are described by means of the formula components given in the table and below. They can be prepared according to the invention, for example by repeating one of the above Working Examples, using the compounds apparent from these components. They are suitable for dyeing the fiber materials mentioned in the description, such as, in particular, cellulose fiber materials and produce strong and fast dyeings in the shade indicated in the particular Table Example (here on cotton) by the dyeing and printing methods customary in the art of fiber-reactive dyes.

The formula radicals $D^{10}$ to $D^{28}$ and $K^{10}$ to $K^{24}$ given in the Table Examples have the following meanings:

$D^{10}$ is 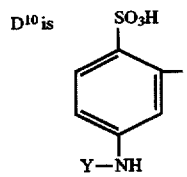

-continued $D^{11}$ is 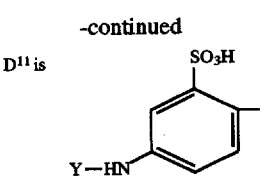

D¹² is 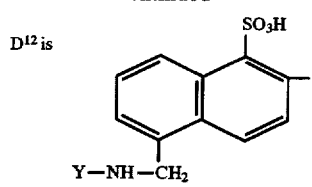
D¹³ is 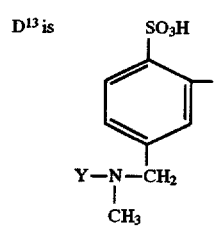
D¹⁴ is 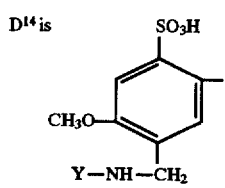
D¹⁵ is 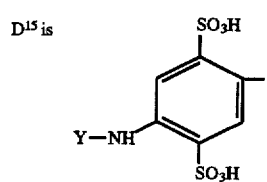
D¹⁶ is 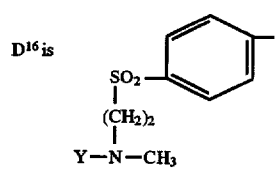
D¹⁷ is 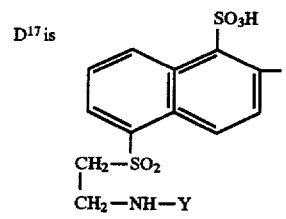
D¹⁸ is 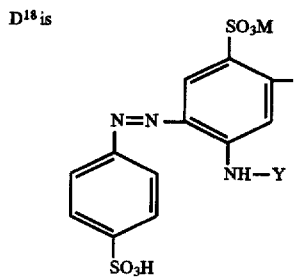
D¹⁹ is 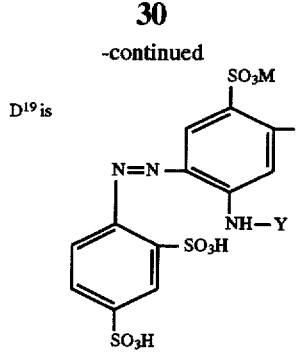
D²⁰ is 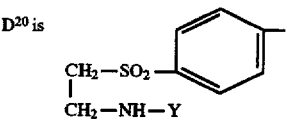
D²¹ is 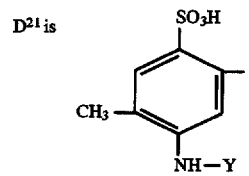
D²² is 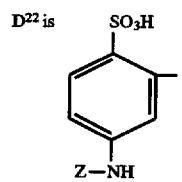
D²³ is 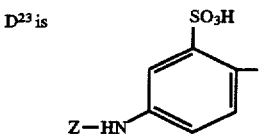
D²⁴ is 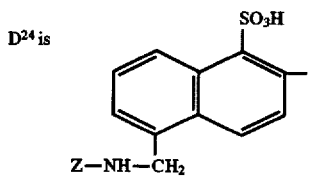
D²⁵ is 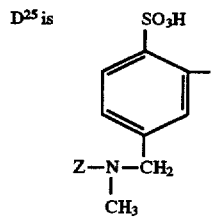
D²⁶ is 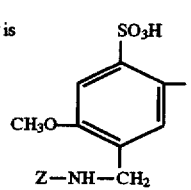

-continued
$D^{27}$ is 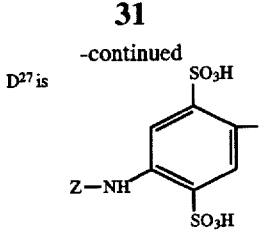
$D^{28}$ is 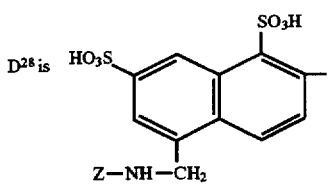
—$K^{10}$ is 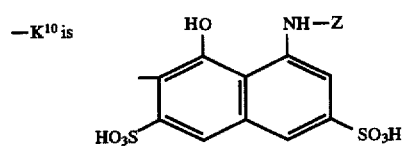
—$K^{11}$ is 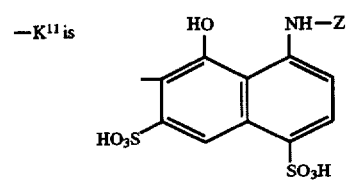
—$K^{12}$ is 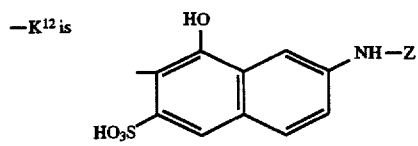
—$K^{13}$ is 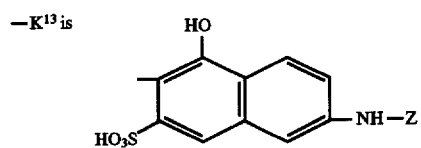
—$K^{14}$ is 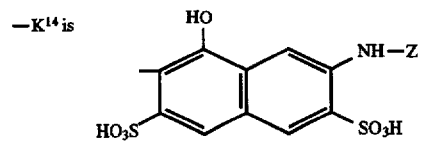
—$K^{15}$ is 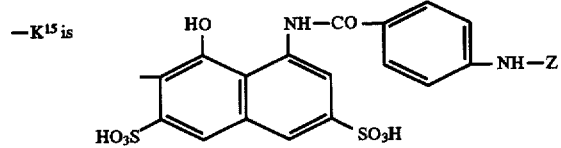
—$K^{16}$ is 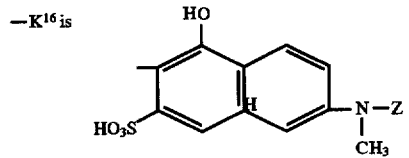
-continued
—$K^{17}$ is 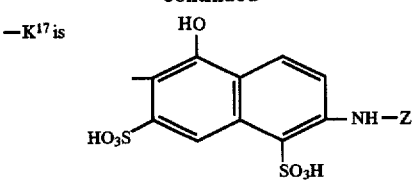
—$K^{18}$ is 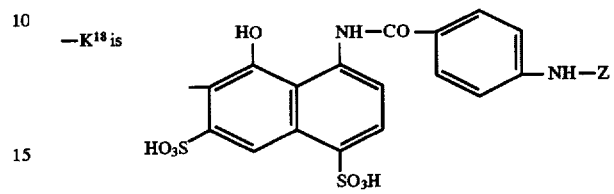
—$K^{19}$ is 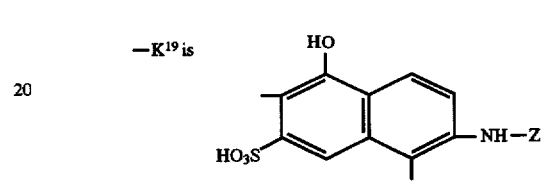
$K^{20}$ is 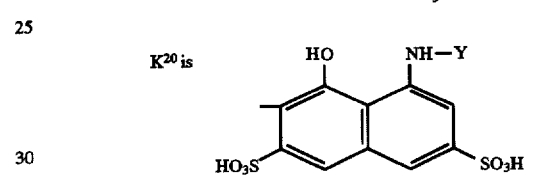
$K^{21}$ is 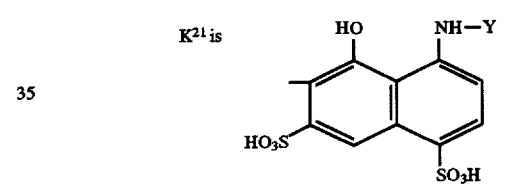
$K^{22}$ is 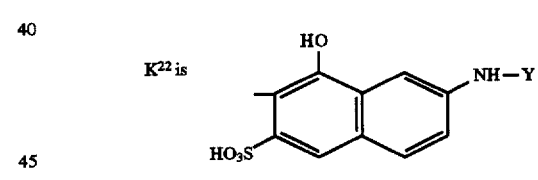
$K^{23}$ is 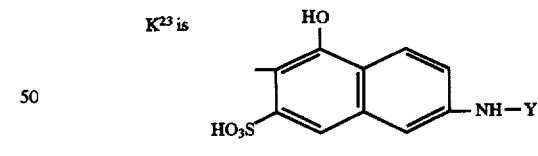
$K^{24}$ is 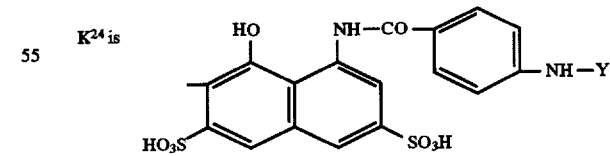

| Ex. | Radical | Radical-K° | Radical Y | Radical Z | Shade |
|---|---|---|---|---|---|
| 11 | $D^{11}$- | -$K^{11}$ | 2-methoxy-4-{N-phenyl-N-[β-(β'-sulfatoethylsulfonyl)-ethyl]}amino-1,3,5-triazin-6-yl | 2-fluoro-4-(N-phenyl-N-ethyl-amino-1,3,5-triazin-6-yl | red (540) |
| 12 | $D^{14}$- | -$K^{11}$ | 2-phenoxy-4-{N-phenyl-N-[β-(β'-sulfatoethylsulfonyl)-ethyl]}amino-1,3,5-triazin-6-yl | 2-fluoro-4-morpholino-1,3,5-triazin-6-yl | red (545) |
| 13 | $D^{12}$- | -$K^{11}$ | 2-phenoxy-4-{N-phenyl-N-[β-(β'-sulfatoethylsulfonyl)-ethyl]}amino-1,3,5-triazin-6-yl | 2-fluoro-4-[N-methyl-N-(β-sulfoethyl)]amino-1,3,5-triazin-6-yl | red (537) |
| 14 | $D^{11}$- | -$K^{11}$ | 2-cyanoamino-4-{N-phenyl-N-[γ-(β'-sulfatoethylsulfonyl)propyl]}amino-1,3,5-triazin-6-yl | 2-chloro-4-(morpholino-1,3,5-triazin-6-yl | red (542) |
| 15 | $D^{10}$- | -$K^{11}$ | 2-methoxy-4-{N-phenyl-N-[β-(β'-sulfatoethylsulfonyl)-ethyl]}amino-1,3,5-triazin-6-yl | 2-fluoro-4-[N-methyl-N-(β-cyanoethyl)]amino-1,3,5-triazin-6-yl | red (541) |
| 16 | $D^{10}$- | -$K^{10}$ | 2-methoxy-4-{N-phenyl-N-[β-(β'-sulfatoethylsulfonyl)-ethyl]}amino-1,3,5-triazin-6-yl | 2-fluoro-4-[N-phenyl-N-(β-hydroxyethyl)]amino-1,3,5-triazin-6-yl | red (541) |
| 17 | $D^{10}$- | -$K^{10}$ | 2-cyanoamino-4-{N-phenyl-N-[γ-(β'-sulfatoethyl sulfonyl)propyl]}amino-1,3,5-triazin-6-yl | 2-fluoro-4-(N-phenyl-N-ethyl)amino-1,3,5-triazin-6-yl | red (532) |
| 18 | $D^{10}$- | -$K^{10}$ | 2-amino-4-[4'-(β-sulfatoethylsulfonylmethyl)phenyl]-amino-1,3,5-triazin-6-yl | 2-fluoro-4-morpholino-1,3,5-triazin-6-yl | red (535) |
| 19 | $D^{10}$- | -$K^{10}$ | 2-amino-4-[3'-(β-sulfatoethylsulfonylmethyl)phenyl]-amino-1,3,5-triazin-6-yl | 2-fluoro-4-morpholino-1,3,5-triazin-6-yl | red (531) |
| 20 | $D^{15}$- | -$K^{10}$ | 2-cyanoamino-4-{N-phenyl-N-[β-(β'-sulfatoethyl-sulfonyl)ethyl]}amino-1,3,5-triazin-6-yl | 2-fluoro-4-morpholino-1,3,5-triazin-6-yl | red (540) |
| 21 | $D^{16}$- | -$K^{10}$ | 2-amino-4-{N-methyl-N-[β-(β'-sulfatoethylsulfonyl)-ethyl]}amino-1,3,5-triazin-6-yl | 2-fluoro-4-(N-phenyl-N-ethyl)amino-1,3,5-triazin-6-yl | red (525) |
| 22 | $D^{17}$- | -$K^{10}$ | 2-methoxy-4-{N-methyl-N-[β'-sulfatoethylsulfonyl)-ethyl]}amino-1,3,5-triazin-6-yl | 2-fluoro-4-(N-phenyl-N-ethyl)amino-1,3,5-triazin-6-yl | red (542) |
| 23 | $D^{10}$- | -$K^{10}$ | 2-cyanoamino-4-{N-phenyl-N-[γ-(β'-sulfatoethyl sulfonyl)propyl]}amino-1,3,5-triazin-6-yl | 2-fluoro-4-(N-β-hydroxyethyl)-amino-1,3,5-triazin-6-yl | red (531) |
| 24 | $D^{10}$- | -$K^{10}$ | 2-cyanoamino-4-N-[(β-(vinylsulfonylethoxy)ethyl]amino-1,3,5-triazin-6-yl | 2-fluoro-4-morpholino-1,3,5-triazin-6-yl | red (532) |
| 25 | $D^{10}$- | -$K^{10}$ | 2-cyanoamino-4-N-[γ-(β'-sulfatoethylsulfonyl)propyl-amino-1,3,5-triazin-6-yl | 2-fluoro-4-morpholino-1,3,5-triazin-6-yl | red (532) |
| 26 | $D^{13}$- | -$K^{13}$ | 2-methoxy-4-N-[β-(β'-sulfatoethylsulfonyl)ethyl]amino-1,3,5-triazin-6-yl | 2-fluoro-4-morpholino-1,3,5-triazin-6-yl | orange (495) |
| 27 | $D^{10}$- | -$K^{13}$ | 2-methoxy-4-N-[β-(β'-sulfatoethylsulfonyl)ethyl]amino-1,3,5-triazin-6-yl | 2-fluoro-4-(N-phenyl-N-ethyl)amino-1,3,5-triazin-6-yl | orange (496) |
| 28 | $D^{10}$- | -$K^{14}$ | 2-methoxy-4-N-[β-(β'-sulfatoethylsulfonyl)ethyl]amino-1,3,5-triazin-6-yl | 2-fluoro-4-(N-phenyl-N-ethyl)amino-1,3,5-triazin-6-yl | scarlet (498) |
| 29 | $D^{10}$- | -$K^{15}$ | 2-methoxy-4-N-[β-(β'-sulfatoethylsulfonyl)ethyl]amino-1,3,5-triazin-6-yl | 2-fluoro-4-morpholino-1,3,5-triazin-6-yl | red (520) |
| 30 | $D^{13}$- | -$K^{15}$ | 2-amino-4-N-[β-(β'-sulfatoethylsulfonyl)ethyl]amino-1,3,5-triazin-6-yl | 2-fluoro-4-(N-phenyl-N-methyl)amino-1,3,5-triazin-6-yl | red (521) |
| 31 | $D^{11}$- | -$K^{13}$ | 2-amino-4-N-[β-(β'-sulfatoethylsulfonyl)ethyl]amino-1,3,5-triazin-6-yl | 2-fluoro-4-morpholino-1,3,5-triazin-6-yl | orange (491) |
| 32 | $D^{10}$- | -$K^{12}$ | 2-cyanoamino-4-N-[β-(β'-sulfatoethylsulfonyl)ethyl]-amino-1,3,5-triazin-6-yl | 2-fluoro-4-N-(β-sulfoethyl)-amino-1,3,5-triazin-6-yl | orange (487) |
| 33 | $D^{18}$- | -$K^{13}$ | 2-cyanoamino-4-N-[β-(β'-sulfatoethylsulfonyl)ethyl]-amino-1,3,5-triazin-6-yl | 2-fluoro-4-N-(β-hydroxyethyl)-amino-1,3,5-triazin-6-yl | scarlet (505) |
| 34 | $D^{19}$- | -$K^{16}$ | 2-cyanoamino-4-N-[β-(β'-sulfatoethylsulfonyl)ethyl]-amino-1,3,5-triazin-6-yl | 2-fluoro-4-[N-methyl-N-(β-hydroxyethyl)]amino-1,3,5-triazin-6-yl | scarlet (499) |
| 35 | $D^{15}$- | -$K^{13}$ | 2-cyanoamino-4-N-[β-(β'-sulfatoethylsulfonyl)ethyl]-amino-1,3,5-triazin-6-yl | 2,4-dichloro-1,3,5-triazin-6-yl | orange (493) |
| 36 | $D^{10}$- | -$K^{10}$ | 2-cyanoamino-4-N-[β-(β'-sulfatoethylsulfonyl)ethyl]-amino-1,3,5-triazin-6-yl | 2-fluoro-4-morpholino-1,3,5-triazin-6-yl | red (520) |
| 37 | $D^{10}$- | -$K^{10}$ | 2-(3'-carboxypyridinium)-4-N-[β-(β'-sulfato-ethylsulfonyl)ethyl]amino-1,3,5-triazin-6-yl | 2-chloro-4-(N-phenyl-N-ethyl)amino-1,3,5-triazin-6-yl | red (527) |
| 38 | $D^{10}$- | -$K^{11}$ | 2-cyanoamino-4-N-[β-(β'-sulfatoethylsulfonyl)ethyl]-amino-1,3,5-triazin-6-yl | 2-chloro-4-(N-phenyl-N-ethyl)amino-1,3,5-triazin-6-yl | red (536) |
| 39 | $D^{10}$- | -$K^{11}$ | 2-cyanoamino-4-N-[β-(β'-sulfatoethylsulfonyl)-ethyl]-amino-1,3,5-triazin-6-yl | 2-chloro-4-morpholino-1,3,5-triazin-6-yl | red (535) |
| 40 | $D^{10}$- | -$K^{10}$ | 2-cyanoamino-4-N-[(β(vinylsulfonylethoxy)ethyl]-amino-1,3,5-triazin-6-yl | 2-fluoro-4-morpholino-1,3,5-triazin-6-yl | red (541) |
| 41 | $D^{10}$- | -$K^{11}$ | 2-cyanoamino-4-N-[γ-(β'-sulfatoethylsulfonyl)propyl]-amino-1,3,5-triazin-6-yl | 2-fluoro-4-morpholino-1,3,5-triazin-6-yl | red (533) |
| 42 | $D^{10}$- | -$K^{13}$ | 2-amino-4-{N-phenyl-N-[β-(β'-sulfatoethylsulfonyl)-ethyl]}amino-1,3,5-triazin-6-yl | 2-chloro-4-(3'-sulfophenyl)-amino-1,3,5-triazin-6-yl | orange (490) |
| 43 | $D^{15}$- | -$K^{13}$ | 2-phenoxy-4-{N-phenyl-N-[β-(β'-sulfatoethylsulfonyl)-ethyl]}amino-1,3,5-triazin-6-yl | 2-chloro-4-morpholino-1,3,5-triazin-6-yl | orange (489) |
| 44 | $D^{18}$- | -$K^{13}$ | 2-cyanoamino-4-{N-phenyl-N-[β-(β'-sulfatoethyl-sulfonyl)ethyl]}amino-1,3,5-triazin-6-yl | 2-chloro-4-(β-sulfoethyl)-amino-1,3,5-triazin-6-yl | scarlet (503) |
| 45 | $D^{10}$- | -$K^{16}$ | 2-cyanoamino-4-{N-phenyl-N-[γ-(β'-sulfatoethyl-sulfonyl)propyl]}amino-1,3,5-triazin-6-yl | 2-fluoro-4-(β-sulfoethyl)-amino-1,3,5-triazin-6-yl | orange (488) |
| 46 | $D^{10}$- | -$K^{10}$ | 2-cyanoamino-4-{N-phenyl-N-[γ-(β'-sulfatoethyl-sulfonyl)propyl]}amino-1,3,5-triazin-6-yl | 2-fluoro-4-(N'-sulfomethyl)-piperidin-N-yl-1,3,5-triazin-6-yl | red (519) |
| 47 | $D^{10}$- | -$K^{10}$ | 2-cyanoamino-4-{N-(3'-methylphenyl)-N-[β-(β'-sulfatoethylsulfonyl)ethyl]}amino-1,3,5-triazin-6-yl | 2-fluoro-4-morpholino-1,3,5-triazin-6-yl | red (519) |
| 48 | $D^{13}$- | -$K^{10}$ | 2-cyanoamino-4-{N-phenyl-N-[β-(β'-sulfato- | 2-fluoro-4-morpholino-1,3,5- | red (522) |

| Ex. | Radical | Radical-K° | Radical Y | Radical Z | Shade |
|---|---|---|---|---|---|
| 49 | $D^{12}$- | -$K^{10}$ | ethylsulfonyl)ethyl]}amino-1,3,5-triazin-6-yl 2-cyanoamino-4-{N-phenyl-N-[β-(β'-sulfato-ethylsulfonyl)ethyl]}amino-1,3,5-triazin-6-yl | triazin-6-yl 2-fluoro-4-(3'-sulfophenyl)-amino-1,3,5-triazin-6-yl | red (540) |
| 50 | $D^{11}$- | -$K^{11}$ | 2-methoxy-4-{N-phenyl-N-[β-(β'-sulfatoethylsulfonyl)-ethyl]}amino-1,3,5-triazin-6-yl | 2-chloro-4-(3'-sulfophenyl)-amino-1,3,5-triazin-6-yl | red (529) |
| 51 | $D^{10}$- | -$K^{18}$ | 2-methoxy-4-{N-phenyl-N-[β-(β'-sulfatoethylsulfonyl)-ethyl]}amino-1,3,5-triazin-6-yl | 2-chloro-4-(3'-sulfophenyl)-amino-1,3,5-triazin-6-yl | red (531) |
| 52 | $D^{10}$- | -$K^{10}$ | 2-(3'-carboxypyridinium)-4-N-[β-(β'-sulfatoethyl-sulfonyl)ethyl]amino-1,3,5-triazin-6-yl | 2-fluoro-4-morpholino-1,3,5-triazin-6-yl | red (518) |
| 53 | $D^{12}$- | -$K^{11}$ | 2-cyanoamino-4-{N-phenyl-N-[β-(β'-sulfatoethyl-sulfonyl)ethyl]}amino-1,3,5-triazin-6-yl | 5-chloro-6-fluoropyrimidin-4-yl | red (520) |
| 54 | $D^{15}$- | -$K^{11}$ | 2-cyanoamino-4-{N-phenyl-N-[β-(β'-sulfatoethyl-sulfonyl)ethyl]}amino-1,3,5-triazin-6-yl | 2,6-difluoropyrimidin-4-yl | red (535) |
| 55 | $D^{10}$- | -$K^{11}$ | 2-cyanoamino-4-{N-phenyl-N-[γ-(β'-sulfatoethyl-sulfonyl)propyl]}amino-1,3,5-triazin-6-yl | 5-chloro-6-fluoropyrimidin-4-yl | red (526) |
| 56 | $D^{18}$- | -$K^{13}$ | 2-cyanoamino-4-{N-phenyl-N-[β-(β'-sulfatoethyl-sulfonyl)ethyl]}amino-1,3,5-triazin-6-yl | 5-chloro-6-fluoropyrimidin-4-yl | scarlet (501) |
| 57 | $D^{13}$- | -$K^{13}$ | 2-cyanoamino-4-{N-phenyl-N-[β-(β'-sulfatoethyl-sulfonyl)ethyl]}amino-1,3,5-triazin-6-yl | 5-chloro-2,6-difluoro-pyrimidin-4-yl | orange (493) |
| 58 | $D^{15}$- | -$K^{13}$ | 2-cyanoamino-4-{N-4'-sulfophenyl-N-[β-(β'-sulfatoethylsulfonyl)ethyl]}-1,3,5-triazin-6-yl | 5-chloro-6-fluoropyrimidin-4-yl | orange (494) |
| 59 | $D^{10}$- | -$K^{13}$ | 2-amino-4-{N-phenyl-N-[β-(β'-sulfatoethylsulfonyl)-ethyl]}1,3,5-triazin-6-yl | 2,5,6-trichloropyrimidin-4-yl | orange (492) |
| 60 | $D^{10}$- | -$K^{16}$ | 2-cyanoamino-4-{N-phenyl-N-[β-(β'-sulfatoethyl-sulfonyl)-ethyl]}-1,3,5-triazin-6-yl | 5-chloro-2,6-difluoro-pyrimidin-4-yl | orange (492) |
| 61 | $D^{11}$- | -$K^{18}$ | 2-phenoxy-4-{N-phenyl-N-[β-(β'-sulfatoethylsulfonyl)-ethyl]}1,3,5-triazin-6-yl | 5-chloro-6-fluoropyrimidin-4-yl | red (515) |
| 62 | $D^{13}$- | -$K^{15}$ | 2-methoxy-4-{N-phenyl-N-[β-(β'-sulfatoethylsulfonyl)-ethyl]}1,3,5-triazin-6-yl | 5-chloro-6-fluoropyrimidin-4-yl | red (517) |
| 63 | $D^{12}$- | -$K^{10}$ | 2-methoxy-4-{N-phenyl-N-[β-(β'-sulfatoethylsulfonyl)-ethyl]}1,3,5-triazin-6-yl | 5-chloro-2,6-difluoro-pyrimidin-4-yl | red (545) |
| 64 | $D^{15}$- | -$K^{18}$ | 2-(3'-carboxypyridinium)-4-{N-phenyl-N-[β-(β'-sulfatoethylsulfonyl)ethyl]}-1,3,5-triazin-6-yl | 5,6-difluoropyrimidin-4-yl | red (513) |
| 65 | $D^{10}$- | -$K^{15}$ | 2-cyanoamino-4-{N-phenyl-N-[β-(β'-sulfatoethyl-sulfonyl)ethyl]}-1,3,5-triazin-6-yl | 5,6-dichloropyrimidin-4-yl | red (519) |
| 66 | $D^{20}$- | -$K^{10}$ | 2-cyanoamino-4-{N-phenyl-N-[β-(β'-sulfatoethyl-sulfonyl)-ethyl]}-1,3,5-triazin-6-yl | 5-chloro-6-fluoropyrimidin-4-yl | red (523) |
| 67 | $D^{11}$- | -$K^{10}$ | 2-methoxy-4-{N-phenyl-N-[β-(β'-sulfatoethylsulfonyl)-ethyl]}-1,3,5-triazin-6-yl | 2,6-difluoropyrimidin-4-yl | red (525) |
| 68 | $D^{10}$- | -$K^{10}$ | 2-phenoxy-4-{N-phenyl-N-[β-(β'-sulfatoethylsulfonyl)-ethyl]}-1,3,5-triazin-6-yl | 2,6-difluoropyrimidin-4-yl | red (526) |
| 69 | $D^{12}$- | -$K^{10}$ | 2-cyanoamino-4-{N-phenyl-N-[β-(β'-sulfatoethyl-sulfonyl)ethyl]}-1,3,5-triazin-6-yl | 2,6-difluoropyrimidin-4-yl | red (530) |
| 70 | $D^{13}$- | -$K^{11}$ | 2-cyanoamino-4-{N-methyl-N-[γ-(β'-sulfatoethyl-sulfonyl)propyl]}amino-1,3,5,-triazin-6-yl | 5-chloro-2,6-difluoro-pyrimidin-4-yl | red (530) |
| 71 | $D^{12}$- | -$K^{11}$ | 2-cyanoamino-4-{N-methyl-N-[β-(β'-sulfatoethyl-sulfonyl)ethyl]}amino-1,3,5,-triazin-6-yl | 5-chloro-2,6-difluoro-pyrimidin-4-yl | red (530) |
| 72 | $D^{15}$- | -$K^{11}$ | 2-cyanoamino-4-{N-phenyl-N-[β-(β'-sulfatoethyl-sulfonyl)ethyl]}amino-1,3,5,-triazin-6-yl | 5-chloro-2,6-difluoro-pyrimidin-4-yl | red (521) |
| 73 | $D^{10}$- | -$K^{11}$ | 2-cyanoamino-4-{N-phenyl-N-[β-(β'-sulfatoethyl-sulfonyl)ethyl]}amino-1,3,5,-triazin-6-yl | 5,6-dichloropyrimidin-4-yl | red (533) |
| 74 | $D^{11}$- | -$K^{19}$ | 2-cyanoamino-4-{N-phenyl-N-[β-(β'-sulfatoethyl-sulfonyl)ethyl]}amino-1,3,5,-triazin-6-yl | 5-chloro-2,6-difluoro-pyrimidin-4-yl | orange (488) |
| 75 | $D^{12}$- | -$K^{14}$ | 2-methoxy-4-{N-phenyl-N-[β-(β'-sulfatoethylsulfonyl)-ethyl]}amino-1,3,5-triazin-6-yl | 5-chloro-2,6-difluoro-pyrimidin-4-yl | orange (493) |
| 76 | $D^{15}$- | -$K^{12}$ | 2-methoxy-4-{N-phenyl-N-[β-(β'-sulfatoethylsulfonyl)-ethyl]}amino-1,3,5-triazin-6-yl | 5-chloro-2,6-difluoro-pyrimidin-4-yl | orange (486) |
| 77 | $D^{10}$- | -$K^{11}$ | 2-methoxy-4-{N-phenyl-N-[β-(β'-sulfatoethylsulfonyl)-ethyl]}amino-1,3,5-triazin-6-yl | 5-chloro-2,6-difluoro-pyrimidin-4-yl | red (526) |
| 78 | $D^{21}$- | -$K^{10}$ | 2-methoxy-4-{N-phenyl-N-[β-(β'-sulfatoethylsulfonyl)-ethyl]}amino-1,3,5-triazin-6-yl | 5-chloro-6-fluoropyrimidin-4-yl | red (530) |
| 79 | $D^{11}$- | -$K^{10}$ | 2-cyanoamino-4-{N-methyl-N-[β-(β'-sulfatoethyl-sulfonyl)ethyl]}amino-1,3,5-triazin-6-yl | 5-chloro-6-fluoropyrimidin-4-yl | red (533) |
| 80 | $D^{13}$- | -$K^{10}$ | 2-methoxy-4-{N-phenyl-N-[β-(β'-sulfatoethylsulfonyl)-ethyl]}amino-1,3,5-triazin-6-yl | 5-chloro-6-fluoropyrimidin-4-yl | red (529) |
| 81 | $D^{12}$- | -$K^{10}$ | 2-cyanoamino-4-{N-phenyl-N-[β-(β'-sulfatoethyl-sulfonyl)ethyl]}amino-1,3,5-triazin-6-yl | 5-chloro-6-fluoropyrimidin-4-yl | red (527) |
| 82 | $D^{13}$- | -$K^{11}$ | 2-cyanoamino-4-{N-phenyl-N-[β-(β'-sulfatoethyl-sulfonyl)ethyl]}amino-1,3,5-triazin-6-yl | 5-chloro-6-fluoropyrimidin-4-yl | red (535) |
| 83 | $D^{13}$- | -$K^{10}$ | 2-cyanoamino-4-{N-phenyl-N-[β-(β'-sulfatoethyl-sulfonyl)ethyl]}amino-1,3,5-triazin-6-yl | 2,3-dichloroquinoxaline-6-carbonyl | red (536) |
| 84 | $D^{12}$- | -$K^{10}$ | 2-cyanoamino-4-{N-phenyl-N-[β-(β'-sulfatoethyl-sulfonyl)ethyl]}amino-1,3,5-triazin-6-yl | 2,3-dichloroquinoxaline-6-carbonyl | red (531) |
| 85 | $D^{11}$- | -$K^{10}$ | 2-methoxy-4-{N-phenyl-N-[β-(β'-sulfatoethylsulfonyl)-ethyl]}amino-1,3,5-triazin-6-yl | 2,3-dichloroquinoxaline-6-carbonyl | red (532) |
| 86 | $D^{18}$- | -$K^{13}$ | 2-methoxy-4-{N-phenyl-N-[β-(β'-sulfatoethylsulfonyl)-ethyl]}amino-1,3,5-triazin-6-yl | 2,3-dichloroquinoxaline-6-carbonyl | orange (490) |
| 87 | $D^{13}$- | -$K^{13}$ | 2-methoxy-4-{N-phenyl-N-[β-(β'-sulfatoethylsulfonyl)-ethyl]}amino-1,3,5-triazin-6-yl | 2,3-dichloroquinoxaline-6- | orange (490) |

-continued

| Ex. | Radical | Radical-K° | Radical Y | Radical Z | Shade |
|---|---|---|---|---|---|
| 88 | $D^{10}$- | -$K^{13}$ | 2-methoxy-4-{N-phenyl-N-[β-(β'-sulfatoethylsulfonyl)-ethyl]}amino-1,3,5-triazin-6-yl | 2,3-dichloroquinoxaline-6-carbonyl | orange (488) |
| 89 | $D^{10}$- | -$K^{16}$ | 2-ethoxy-4-{N-phenyl-N-[β-(β'-sulfatoethylsulfonyl)-ethyl]}amino-1,3,5-triazin-6-yl | 2,3-dichloroquinoxaline-6-carbonyl | orange (491) |
| 90 | $D^{11}$- | -$K^{11}$ | 2-cyanoamino-4-{N-phenyl-N-[β-(β'-sulfatoethylsulfonyl)ethyl]}amino-1,3,5-triazin-6-yl | 2,3-dichloroquinoxaline-6-carbonyl | red (528) |
| 91 | $D^{13}$- | -$K^{11}$ | 2-cyanoamino-4-{N-phenyl-N-[β-(β'-sulfatoethylsulfonyl)ethyl]}amino-1,3,5-triazin-6-yl | 2,3-dichloroquinoxaline-6-carbonyl | red (528) |
| 92 | $D^{15}$- | -$K^{11}$ | 2-methoxy-4-{N-phenyl-N-[β-(β'-sulfatoethylsulfonyl)-ethyl]}amino-1,3,5-triazin-6-yl | 2,3-dichloroquinoxaline-6-carbonyl | red (530) |
| 93 | $D^{10}$- | -$K^{11}$ | 2-cyanoamino-4-{N-phenyl-N-[β-(β'-sulfatoethylsulfonyl)ethyl]}amino-1,3,5-triazin-6-yl | 2,3-dichloroquinoxaline-6-carbonyl | red (527) |
| 94 | $D^{27}$- | -$K^{21}$ | 2-methoxy-4-{N-phenyl-N-[β-(β'-sulfatoethylsulfonyl)-ethyl]}amino-1,3,5-triazin-6-yl | 2-fluoro-4-(N-phenyl-N-ethyl)amino-1,3,5-triazin-6-yl | red (520) |
| 95 | $D^{22}$- | -$K^{24}$ | 2-methoxy-4-{N-phenyl-N-[β-(β'-sulfatoethylsulfonyl)-ethyl]}amino-1,3,5-triazin-6-yl | 2-fluoro-4-(N-phenyl-N-ethyl)amino-1,3,5-triazin-6-yl | red |
| 96 | $D^{25}$- | -$K^{24}$ | 2-methoxy-4-{N-phenyl-N-[β-(β'-sulfatoethylsulfonyl)-ethyl]}amino-1,3,5-triazin-6-yl | 2-fluoro-4-(N-phenyl-N-ethyl)amino-1,3,5-triazin-6-yl | red |
| 97 | $D^{20}$- | -$K^{20}$ | 2-(3'-carboxypyridinium)-4-{N-phenyl-N-[β-(β'-sulfatoethylsulfonyl)ethyl]}amino-1,3,5-triazin-6-yl | 2-fluoro-4-morpholino-1,3,5-triazin-6-yl | red (528) |
| 98 | $D^{27}$- | -$K^{20}$ | 2-(3'-carboxypyridinium)-4-{N-phenyl-N-[β-(β'-sulfatoethylsulfonyl)ethyl]}amino-1,3,5-triazin-6-yl | 2-fluoro-4-(2'-methoxy-5'-sulfophenyl)amino-1,3,5-triazin-6-yl | red (527) |
| 99 | $D^{25}$- | -$K^{20}$ | 2-(3'-carboxypyridinium)-4-{N-phenyl-N-[β-(β'-sulfatoethylsulfonyl)ethyl]}amino-1,3,5-triazin-6-yl | 2-fluoro-4-(2'-methoxy-5'-sulfophenyl)amino-1,3,5-triazin-6-yl | red (525) |
| 100 | $D^{25}$- | -$K^{23}$ | 2-cyanoamino-4-{N-(4'-sulfophenyl)-N-[β-(β'-sulfatoethylsulfonyl)ethyl]}amino-1,3,5-triazin-6-yl | 2-fluoro-4-(3'-sulfophenyl)-amino-1,3,5-triazin-6-yl | orange (491) |
| 101 | $D^{22}$- | -$K^{23}$ | 2-cyanoamino-4-{N-(4'-sulfophenyl)-N-[β-(β'-sulfatoethylsulfonyl)ethyl]}amino-1,3,5-triazin-6-yl | 2-fluoro-4-(3'-sulfophenyl)-amino-1,3,5-triazin-6-yl | orange (493) |
| 102 | $D^{22}$- | -$K^{23}$ | 2-cyanoamino-4-{N-(4'-sulfophenyl)-N-[β-(β'-sulfatoethylsulfonyl)ethyl]}amino-1,3,5-triazin-6-yl | 2-fluoro-4-(2'-methoxy-5'-sulfo-phenyl)amino-1,3,5-triazin-6-yl | orange (490) |
| 103 | $D^{23}$- | -$K^{20}$ | 2-cyanoamino-4-{N-phenyl-N-[β-(β'-sulfatoethylsulfonyl)ethyl]}amino-1,3,5-triazin-6-yl | 2-fluoro-4-morpholino-1,3,5-triazin-6-yl | red (531) |
| 104 | $D^{25}$- | -$K^{20}$ | 2-cyanoamino-4-{N-phenyl-N-[β-(β'-sulfatoethylsulfonyl)ethyl]}amino-1,3,5-triazin-6-yl | 2-fluoro-4-morpholino-1,3,5-triazin-6-yl | red (530) |
| 105 | $D^{24}$- | -$K^{20}$ | 2-cyanoamino-4-{N-phenyl-N-[β-(β'-sulfatoethylsulfonyl)ethyl]}amino-1,3,5-triazin-6-yl | 2-fluoro-4-(3'-sulfophenyl)-amino-1,3,5-triazin-6-yl | red (529) |
| 106 | $D^{24}$- | -$K^{20}$ | 2-cyanoamino-4-{N-(3'-sulfophenyl)-N-[γ-(β'-sulfatoethylsulfonyl)propyl]}amino-1,3,5-triazin-6-yl | 2-chloro-4-[N-(2',5'-disulfo-phenyl)amino-1,3,5-triazin-6-yl | red (527) |
| 107 | $D^{22}$- | -$K^{24}$ | 2-methoxy-4-{N-phenyl-N-[β-(β'-sulfatoethylsulfonyl)ethyl]}amino-1,3,5-triazin-6-yl | 2-chloro-4-[N-(2',5'-disulfo-phenyl)amino-1,3,5-triazin-6-yl | red |
| 108 | $D^{25}$- | -$K^{24}$ | 2-methoxy-4-{N-phenyl-N-[β-(β'-sulfatoethylsulfonyl)ethyl]}amino-1,3,5-triazin-6-yl | 2-chloro-4-[N-(2',5'-disulfo-phenyl)amino-1,3,5-triazin-6-yl | red |
| 109 | $D^{25}$- | -$K^{23}$ | 2-ethoxy-4-{N-phenyl-N-[β-(β'-sulfatoethylsulfonyl)ethyl]}amino-1,3,5-triazin-6-yl | 2-chloro-4-[N-(2',5'-disulfo-phenyl)amino-1,3,5-triazin-6-yl | orange (490) |
| 110 | $D^{27}$- | -$K^{20}$ | 2-cyanoamino-4-{N-phenyl-N-[β-(β'-sulfatoethylsulfonyl)ethyl]}amino-1,3,5-triazin-6-yl | 2-chloro-4-(4'-chlorophenyl)-amino-1,3,5-triazin-6-yl | red (525) |
| 111 | $D^{26}$- | -$K^{20}$ | 2-cyanoamino-4-{N-(4'-sulfophenyl)-N-[β-(β'-sulfatoethylsulfonyl)ethyl]}amino-1,3,5-triazin-6-yl | 2-chloro-4-(N-phenyl-N-methyl)amino-1,3,5-triazin-6-yl | red (525) |
| 112 | $D^{25}$- | -$K^{20}$ | 2-cyanoamino-4-{N-phenyl-N-[β-(β'-sulfatoethylsulfonyl)ethyl]}amino-1,3,5-triazin-6-yl | 2,4-difluoro-5-chloro-pyrimidin-6-yl | red (530) |
| 113 | $D^{24}$- | -$K^{20}$ | 2-cyanoamino-4-{N-phenyl-N-[β-(β'-sulfatoethylsulfonyl)ethyl]}amino-1,3,5-triazin-6-yl | 2,4-difluoro-5-chloro-pyrimidin-6-yl | red (531) |
| 114 | $D^{27}$- | -$K^{21}$ | 2-cyanoamino-4-{N-phenyl-N-[β-(β'-sulfatoethylsulfonyl)ethyl]}amino-1,3,5-triazin-6-yl | 2,4-difluoropyrimidin-6-yl | red (528) |
| 115 | $D^{22}$- | -$K^{21}$ | 2-cyanoamino-4-{N-phenyl-N-[β-(β'-sulfatoethylsulfonyl)ethyl]}amino-1,3,5-triazin-6-yl | 2,4-difluoropyrimidin-6-yl | red (529) |
| 116 | $D^{25}$- | -$K^{21}$ | 2-cyanoamino-4-{N-phenyl-N-[β-(β'-sulfatoethylsulfonyl)ethyl]}amino-1,3,5-triazin-6-yl | 2,4-difluoro-5-chloro-pyrimidin-6-yl | red (525) |
| 117 | $D^{22}$- | -$K^{20}$ | 2-methoxy-4-{N-N-[β-(β'-sulfatoethylsulfonyl)ethyl]}-amino-1,3,5-triazin-6-yl | 4,5-difluoropyrimidin-6-yl | red (525) |
| 118 | $D^{27}$- | -$K^{20}$ | 2-cyanoamino-4-{N-(4'-sulfophenyl)-N-[β-(β'-sulfatoethylsulfonyl)ethyl]}amino-1,3,5-triazin-6-yl | 2,4-difluoro-5-chloro-pyrimidin-6-yl | red (523) |
| 119 | $D^{25}$- | -$K^{20}$ | 2-cyanoamino-4-{N-phenyl-N-[β-(β'-sulfatoethylsulfonyl)ethyl]}amino-1,3,5-triazin-6-yl | 2,4-difluoro-5-chloro-pyrimidin-6-yl | red (526) |
| 120 | $D^{24}$- | -$K^{20}$ | 2-cyanoamino-4-{N-phenyl-N-[β-(β'-sulfatoethylsulfonyl)ethyl]}amino-1,3,5-triazin-6-yl | 2,4-difluoro-5-chloro-pyrimidin-6-yl | red (526) |
| 121 | $D^{22}$- | -$K^{21}$ | 2-cyanoamino-4-{N-phenyl-N-[β-(β'-sulfatoethylsulfonyl)ethyl]}amino-1,3,5-triazin-6-yl | 4-fluoro-5-chloro-pyrimidin-6-yl | red (528) |
| 122 | $D^{22}$- | -$K^{21}$ | 2-cyanoamino-4-{N-phenyl-N-[β-(β'-sulfatoethylsulfonyl)ethyl]}amino-1,3,5-triazin-6-yl | 2,4,5-trichloropyrimidin-6-yl | red (525) |
| 123 | $D^{22}$- | -$K^{20}$ | 2-(3'-carboxypyridinium)-4-{N-phenyl-N-[β-(β' sulfatoethylsulfonyl)ethyl]}amino-1,3,5-triazin-6-yl | 2,4-difluoro-pyrimidin-6-yl | red (530) |
| 124 | $D^{26}$- | -$K^{20}$ | 2-(3'-carboxypyridinium)-4-{N-phenyl-N-[β-(β' sulfatoethylsulfonyl)ethyl]}amino-1,3,5-triazin-6-yl | 2,4-difluoro-pyrimidin-6-yl | red (530) |
| 125 | $D^{24}$- | -$K^{20}$ | 2-(3'-carboxypyridinium)-4-{N-phenyl-N-[β-(β' | 2,4-difluoropyrimidin-6-yl | red (529) |

-continued

| Ex. | Radical | Radical-K° | Radical Y | Radical Z | Shade |
|---|---|---|---|---|---|
| 126 | $D^{22}$- | -$K^{22}$ | sulfatoethylsulfonyl)ethyl]}amino-1,3,5-triazin-6-yl 2-methoxy-4-{N-phenyl-N-[β-(β'-sulfatoethylsulfonyl)-ethyl]}amino-1,3,5-triazin-6-yl | 4-fluoro-5-chloropyrimidin-6-yl | orange (490) |
| 127 | $D^{25}$- | -$K^{23}$ | 2-methoxy-4-{N-phenyl-N-[β-(β'-sulfatoethylsulfonyl)-ethyl]}amino-1,3,5-triazin-6-yl | 2,4-difluoropyrimidin-6-yl | orange (492) |
| 128 | $D^{25}$- | -$K^{23}$ | 2-methoxy-4-{N-(4'-sulfophenyl)-N-[β-(β'-sulfato-ethylsulfonyl)ethyl]}amino-1,3,5-triazin-6-yl | 2,4-difluoro-5-chloro-pyrimidin-6-yl | orange (485) |
| 129 | $D^{23}$- | -$K^{20}$ | 2-cyanoamino-4-[N-phenyl-N-[β-(β'-sulfatoethyl-sulfonyl)ethyl]}amino-1,3,5-triazin-6-yl | 4-fluoro-5-chloropyrimidin-6-yl | red (521) |

We claim:

1. An azo dye having the formula (1)

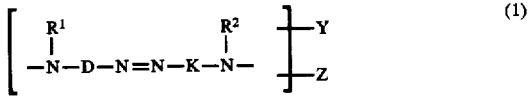

in which:

D is the bivalent radical of a diazo component and is substituted or unsubstituted benzene or naphthalene;

K is, as the radical of a coupling component, a group of the formula (2)

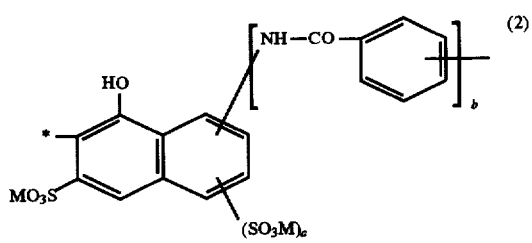

in which

M is hydrogen or an alkali metal, a is zero or 1 (where, if a is zero, this grouping hydrogen), b is zero or 1, and the bond marked with * is attached to the azo group;

$R^1$ is hydrogen or is alkyl of 1 to 6 carbon atoms unsubstituted or substituted;

$R^2$ is hydrogen or is alkyl of 1 to 6 carbon atoms unsubstituted or substituted;

Y is attached to the amino radical —$NR^1$— or —$NR^2$— and is a group of the formula (3)

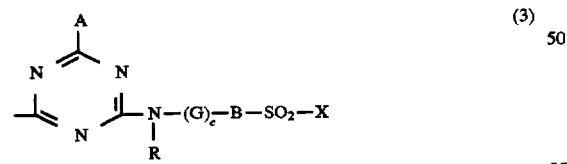

in which

R is hydrogen, alkyl of 1 to 4 carbon atoms unsubtituted or substituted, or is phenyl unsubstituted or substituted, and A is amino, cyanoamino, alkoxy having 1 to 4 carbon atoms, phenoxy, the radical of an N-containing heterocycle optionally containing a further hetero atom, alkylamino having an alkyl of 1 to 4 atoms unsubstitued or substituted by substituents selected from the group consisting of sulfo, carboxy, methyl, ethyl and ethoxy, dialkylamino having alkyl radicals of 1 to 4 carbon atoms unsubstituted or substituted by substituents selected from the group consisting of sulfo, carboxy, methyl, ethyl and ethoxy, or phenylamino unsubstituted or substituted in the phenyl;

c is zero or 1,

G is phenylene unsubstituted or substituted,

R is alkylene having 1 to 6 carbon atoms or is ethyleneoxy-ethylene and

X is β-hydroxyethyl, vinyl, or is ethyl which is subtituted in the β-position by a substituent which can be eliminated by alkali;

Z is attached to the amino radical —$NR^1$— or —$NR^2$— and is a group of the formula (5)

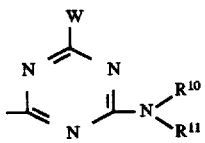

in which

W is chlorine, fluorine or a substituted or unsubstituted pyridinium, $R^{10}$ is hydrogen, alkyl having 1 to 4 carbon atoms, substituted alkyl having 1 to 4 carbon atoms, cycloalkyl having 5 or 6 carbon atoms, phenyl, naphthyl or substituted phenyl or naphthyl, $R^{11}$ has one of the meanings given for $R^{10}$, or the group —$NR^{10}R^{11}$ is N-morpholino, N-piperidino or N-piperazino.

2. An azo dye as claimed in claim 1, wherein

D is a group of a formula (4a), (4b), (4c) or (4d)

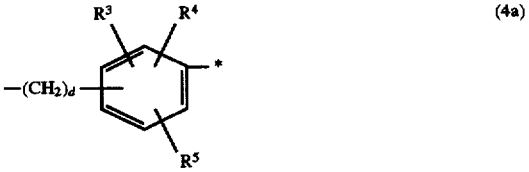

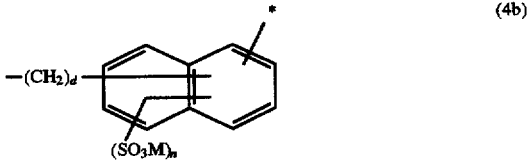

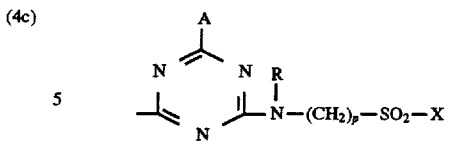 (4c)

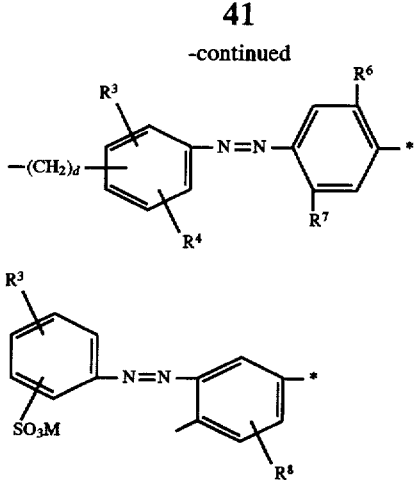 (4d)

in which d is zero or 1,

R³ is hydrogen or sulfo,

R⁴ is hydrogen or sulfo,

R⁵ is hydrogen, methyl, ethyl or methoxy, n is zero, 1, 2 or 3 (where, if n is zero, this group is hydrogen), M has the meaning given in claim 1, R⁶ is hydrogen, alkyl having 1 to 4 carbon atoms, alkoxy having 1 to 4 carbon atoms, hydroxy or sulfo, R⁷ is hydrogen, alkyl having 1 to 4 carbon atoms, alkoxy having 1 to 4 carbon atoms, acylamino, alkylsulfonylamino having 1 to 4 carbon atoms or ureido, and R⁸ is hydrogen, methyl, ethyl or methoxy.

3. An azo dye as claimed in claim 1, wherein K is a group of the formula (2a) or (2b)

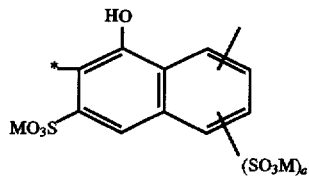 (2a)

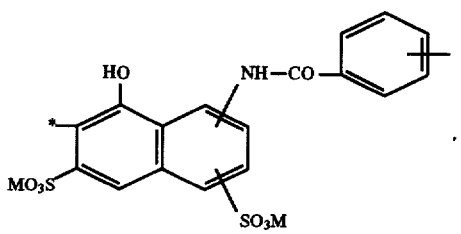 (2b)

in which M, a and * have the meanings given in claim 1.

4. An azo dye as claimed in claim 1, wherein Y is a group of the formula (3a)

$$\text{(3a)}$$

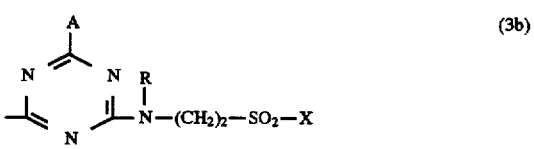

in which

A is amino, cyanoamino, phenoxy, methoxy, ethoxy, morpholino, pyrrolidino, piperazino, piperidino, 3-carboxypyridinyl, 3-aminocarbonylpyridinyl, alkylamino having an alkyl of 1 to 4 carbon atoms unsubstituted or substituted by 1 or 2 substituents selected from the group consisting of sulfo, carboxy, methyl, ethyl, methoxy and ethoxy, dialkylamino having alkyl radicals of 1 to 4 carbon atoms, one of which is optionally substituted by 1 or 2 substituents selected from the group consisting of sulfo, carboxy, methyl, ethyl, methoxy and ethoxy, or is phenylamino or phenylamino which is substituted by 1 or 2 substituents selected from the group consisting of sulfo, carboxy, methyl, ethyl, methoxy and ethoxy, R is hydrogen, methyl, ethyl, phenyl or phenyl which is substituted by 1 or 2 substituents selected from the group consisting of methyl, ethyl and sulfo, p is 2 or 3, and X is vinyl, β-chloroethyl or β-sulfatoethyl.

5. An azo dye as claimed in claim 1, wherein Y is a group of the formula (3b)

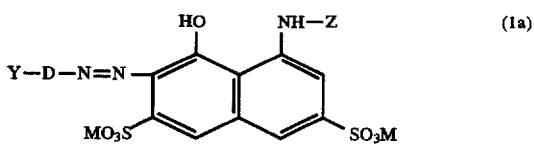 (3b)

in which

A is methoxy, cyanoamino, morpholino, 3-carboxypyridinyl or (β-sulfatoethyl)amino, R is phenyl, and X is vinyl or β-sulfatoethyl.

6. An azo dye as claimed in claim 1, of the formula (1a)

$$\text{(1a)}$$

HO  NH—Z

Y—D—N=N—[naphthalene]

MO₃S       SO₃M in which Y, D and Z is defined as in claim 1 and M is hydrogen or an alkali metal.

7. An azo dye as claimed in claim 6, wherein Z is 2-fluoro-4-(N-morpholino)-1,3,5-triazin-6-yl.

8. An azo dye as claimed in claim 1, of the formula (6)

(6)

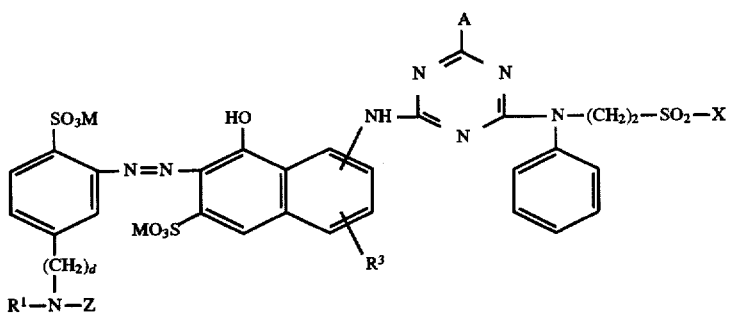

in which
M is hydrogen or an alkali metal,
d is zero or 1,
Z is defined as in claim 1,
R³ is hydrogen or sulfo,
X is vinyl or β-sulfatoethyl,
R¹ is hydrogen, methyl or ethyl, and
A is amino, cyanoamino, methoxy, phenoxy, sulfophenylamino, (β-sulfoethyl)amino, 3-carboxypyridinyl or 3-aminocarbonylpyridinyl.

9. An azo dye as claimed in claim 1, of the formula (7)

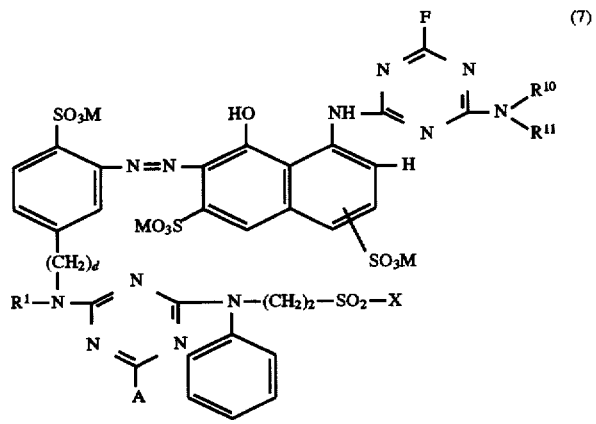

(7)

in which
M is hydrogen or an alkali metal,
d is zero or 1, $R^{10}$ is hydrogen, alkyl having 1 to 4 carbon atoms, substituted alkyl having 1 to 4 carbon atoms, cycloalkyl having 5 or 6 carbon atoms, phenyl, naphthyl or substituted phenyl or naphthyl, $R^{11}$ has one of the meanings given for $R^{10}$, or the group $-NR^{10}R^{11}$ is N-morpholino, N-piperidino or N-piperazino, X is vinyl or β-sulfatoethyl, $R^{1}$ is hydrogen, methyl or ethyl, and A is amino, cyanoamino, methoxy, phenoxy, (β-sulfoethyl)amino, sulfophenylamino, 3-carboxypyridinyl or 3-aminocarbonylpyridinyl.

10. An azo dye as claimed in claim 1, wherein $R^1$ and $R^2$ are both hydrogen.

11. An azo dye as claimed in claim 1, wherein X is vinyl or β-sulfatoethyl.

12. A process for dyeing a hydroxy- or a carboxamido-containing or a hydroxy- and carboxamido-containing material with an azo dye of claim 1, said process comprising:

applying a dye of claim 1 to the material and fixing the dye on the material.

13. A process as claimed in claim 12, wherein the fixing step is carried out by means of heat or by means of an alkaline agent or by means of both heat and an alkaline agent.

14. A process as claimed in claim 12, wherein the material is dyed with aid of heat, by exhaustion or by pad-steam dyeing, and wherein the dyeing yield is substantially independent of the dyeing temperature.

* * * * *